US012555530B2

(12) United States Patent
Park et al.

(10) Patent No.: US 12,555,530 B2
(45) Date of Patent: Feb. 17, 2026

(54) DISPLAY DEVICE GRADUALLY DECREASING INITIALIZATION VOLTAGE WHEN CONVERTING DRIVING FREQUENCY TO LOW FREQUENCY

(71) Applicant: Samsung Display Co., LTD., Yongin-si (KR)

(72) Inventors: Sehyuk Park, Yongin-si (KR); Youngha Sohn, Yongin-si (KR); Jin-Wook Yang, Yongin-si (KR); Donggyu Lee, Yongin-si (KR); Sukhun Lee, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/748,424

(22) Filed: Jun. 20, 2024

(65) Prior Publication Data

US 2025/0174190 A1 May 29, 2025

(30) Foreign Application Priority Data

Nov. 24, 2023 (KR) ........................ 10-2023-0165633

(51) Int. Cl.
*G09G 3/32* (2016.01)
*G09G 3/3233* (2016.01)

(52) U.S. Cl.
CPC ..................... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0247* (2013.01)

(58) Field of Classification Search
CPC ............................................... G09G 3/30–3291
See application file for complete search history.

(56) References Cited

U.S. PATENT DOCUMENTS

| | | | | |
|---|---|---|---|---|
| 10,376,786 | B2 | 8/2019 | Lee et al. | |
| 2021/0287599 | A1* | 9/2021 | Kim | G09G 3/32 |
| 2023/0136391 | A1 | 5/2023 | Hong et al. | |

FOREIGN PATENT DOCUMENTS

| | | | |
|---|---|---|---|
| KR | 20210080789 | * | 7/2021 |
| KR | 1020210080789 | A | 7/2021 |
| KR | 102438199 | B1 | 8/2022 |
| KR | 1020230064482 | A | 5/2023 |

* cited by examiner

*Primary Examiner* — Roy P Rabindranath
(74) *Attorney, Agent, or Firm* — CANTOR COLBURN LLP

(57) ABSTRACT

A display device includes: a light emitting element including an anode and a cathode; a first transistor connected to the anode and a power line, and switchable by a voltage of a first node; a second transistor connected to a data line and a second node, and switchable by a write scan signal; a capacitor connected to the first node and the second node; an initialization transistor connected to the anode and an initialization line configured to receive an initialization voltage, and switchable by a bias scan signal, where the write scan signal is applied to the second transistor at a first frequency and a second frequency lower than the first frequency. When converting from the first frequency to the second frequency, in a k-th frame of the second frequency, a level of the initialization voltage may gradually decrease.

21 Claims, 17 Drawing Sheets

DISPLAY DEVICE GRADUALLY DECREASING INITIALIZATION VOLTAGE WHEN CONVERTING DRIVING FREQUENCY TO LOW FREQUENCY

BACKGROUND

This application claims priority to Korean Patent Application No. 10-2023-0165633, filed on Nov. 24, 2023, and all the benefits accruing therefrom under 35 U.S.C. § 119, the content of which in its entirety is herein incorporated by reference.

The present disclosure herein relates to a display device.

In general, an electronic device which provides images to a user, such as a smart phone, a digital camera, a laptop computer, a navigation system, and a smart television, includes a display device for displaying the images. The display device generates an image, and provides the generated image to a user through a display screen.

The display device includes a plurality of pixels for generating an image and a driver for driving the pixels. Each of the pixels includes a light emitting element, a plurality of transistors connected to the light emitting element, and at least one capacitor connected to the transistors. The pixels are capable of displaying various images, and are driven by various frequencies to display the various images.

When a driving frequency of the pixels is converted from a high frequency to a low frequency, hysteresis properties of the pixels change. For example, each of the pixels includes a driving transistor for driving the light emitting element, and when the driving frequency is converted from a high frequency to a low frequency, hysteresis properties of the driving transistor change.

The above-described change in hysteresis properties may affect luminance. In an initial frame of the low frequency, a change in hysteresis properties is large, and in subsequent frames, a change in hysteresis properties may gradually decrease. In the initial frame with a large change in hysteresis properties, the luminance of the pixels driven by a low frequency may be higher than the luminance of the pixels driven by a high frequency.

Such a luminance difference may be visually recognized by the user, and a phenomenon in which the luminance difference is visually recognized by the user may be defined as a flicker phenomenon. Technology development to reduce the flicker phenomenon is desirable.

SUMMARY

The present disclosure provides a display device which may reduce a flicker phenomenon when a driving frequency of pixels is changed from a high frequency to a low frequency.

An embodiment of the invention provides a display device including: a light emitting element including an anode and a cathode, a first transistor connected to the anode and a power line, and switchable by a voltage of a first node, a second transistor connected to a data line and a second node, and switchable by a write scan signal, a capacitor connected to the first node and the second node, an initialization transistor connected to the anode and an initialization line configured to receive an initialization voltage, and switchable by a bias scan signal, where the write scan signal is applied to the second transistor at a first frequency and a second frequency lower than the first frequency. When converting from the first frequency to the second frequency, in a k-th frame of the second frequency, a level of the initialization voltage may gradually decrease.

In an embodiment of the invention, a display device includes: a light emitting element including an anode and a cathode, a first transistor connected to the anode and a power line, and switchable by a voltage of a first node, a second transistor connected to a data line and a second node, and switchable by a write scan signal, a capacitor connected to the first node and the second node, an initialization transistor connected to the anode and an initialization line configured to receive an initialization voltage, and switchable by a bias scan signal, where the write scan signal is applied to the second transistor at a first frequency and a second frequency lower than the first frequency. When converting from the first frequency to the second frequency, in each of a k-th frame of the second frequency and a k+1-th frame of the second frequency, the level of the initialization voltage gradually changes, and an amount of change in the initialization voltage of the k-th frame is greater than an amount of change in the initialization voltage of the k+1-th frame.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
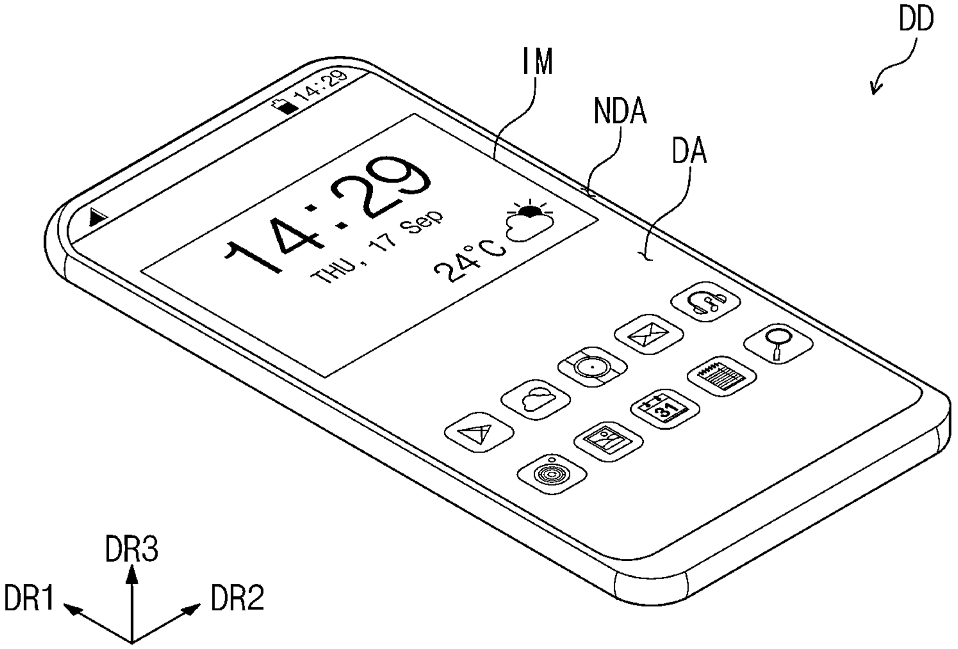
FIG. 1 is a perspective view of a display device according to an embodiment of the invention.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or" includes any and all combinations of one or more of which associated elements may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and are not interpreted in too ideal a sense or an overly formal sense unless explicitly defined herein.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, embodiments of the present invention will be described with reference to the accompanying drawings.

FIG. 1 is a perspective view of a display device according to an embodiment of the invention.

Referring to FIG. 1, a display device DD according to an embodiment of the invention may have long sides extending in a first direction DR1, and may have short sides extending in a second direction DR2 which crosses the first direction DR1. A corner of the display device DD may have a round shape. The shape of the display device DD illustrated in FIG. 1 is exemplarily illustrated, and the display device DD is not limited to the shape illustrated in FIG. 1.

Hereinafter, a direction substantially perpendicularly intersecting a plane defined by the first direction DR1 and the second direction DR2 is defined as a third direction DR3.

Images IM generated in the display device DD may be provided to a user through an upper surface of the display device DD views in the third direction DR3. The upper surface of the display device DD may include a display region DA and a non-display region NDA around the display region DA. The display region DA may display an image, and the non-display region NDA may not display an image. The non-display region NDA may surround the display region DA, and may define the edge of the display device DD to be printed in a predetermined color.

Illustratively, the display device DD is illustrated as a mobile phone, but without being limited thereto, the display device DD may be used for various electronic devices. For example, the display device DD may be used for televisions, monitors, or large electronic devices such as external advertisement boards. Also, the display device DD may be used for small-and-medium-sized electronic devices such as personal computers, laptops, car navigation systems, game consoles, tablet computers, or cameras.

Figure 2:
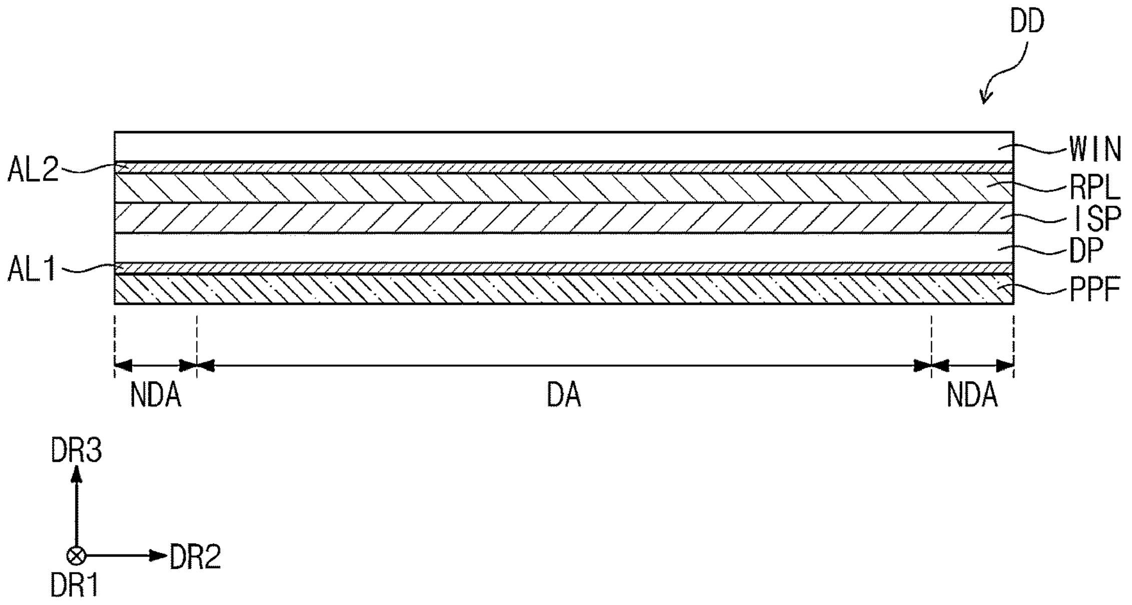
FIG. 2 is a view exemplarily illustrating a cross-section of the display device illustrated in FIG. 1.

FIG. 2 is a view exemplarily illustrating a cross-section of the display device illustrated in FIG. 1.

Illustratively, FIG. 2 illustrates a cross-section of the display device DD viewed from the first direction DR1.

Referring to FIG. 2, the display device DD may include a display panel DP, an input sensing unit ISP, a reflection prevention layer RPL, a window WIN, a panel protection film PPF, and first and second adhesive layers AL1 and AL2.

The display panel DP according to an embodiment of the invention may be a light emitting-type display panel. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum load, and the like. Hereinafter, the display panel DP will be described as the organic light emitting display panel.

The input sensing unit ISP may be disposed on the display panel DP. The input sensing unit ISP may include a plurality of sensors (not shown) for sensing external inputs in a capacitive manner. The input sensing unit ISP may be manufactured directly on the display panel DP when manufacturing the display device DD. However, the embodiment of the invention is not limited thereto, and the input sensing unit ISP may be manufactured as a separate panel from the display panel DP, and be attached to the display panel DP by an adhesive layer.

The reflection prevention layer RPL may be disposed on the input sensing unit ISP. The reflection prevention layer RPL may be manufactured directly on the input sensing unit ISP when manufacturing the display device DD. However, the embodiment of the invention is not limited thereto, and the reflection prevention layer RPL may be manufactured as a separate panel, and be attached to the input sensing unit ISP by an adhesive layer.

The reflection prevention layer RPL may be defined as an external light reflection prevention film. The reflection prevention layer RPL may reduce the reflectance of external light incident from the above of the display device DD toward the display panel DP. External light may not be visible to a user due to reflection prevention layer RPL.

When external light traveling toward the display panel DP is reflected from the display panel DP and provided back to an external user, like a mirror, the user may visually recognize the external light. In order to prevent the above-described phenomenon, illustratively, the reflection prevention layer RPL may include a plurality of color filters for displaying the same color as pixels of the display panel DP.

The color filters may filter the external light to the same color as the pixels. In this case, the external light may not be visually recognized by a user. However, the embodiment of the invention is not limited thereto, and the reflection prevention layer RPL may include a phase retarder and/or a polarizer in order to reduce the reflectance of the external light.

The window WIN may be disposed on the reflection prevention layer RPL. The window WIN may protect the display panel DP, the input sensing unit ISP, and the reflection prevention layer RPL from external scratches and impacts.

The panel protective film PPF may be disposed below the display panel DP. The panel protective film PPF may protect a lower portion of the display panel DP. The panel protective film PPF may include a flexible plastic material such as polyethylene terephthalate ("PET").

The first adhesive layer AL1 is disposed between the display panel DP and the panel protective film PPF, and by the first adhesive layer AL1, the display panel and the panel protective film PPF may be bonded to each other. The second adhesive layer AL2 is disposed between the window WIN and the reflection prevention layer RPL, and by the second adhesive layer AL2. the window WIN and the reflection prevention layer RPL may be bonded to each other.

Figure 3:
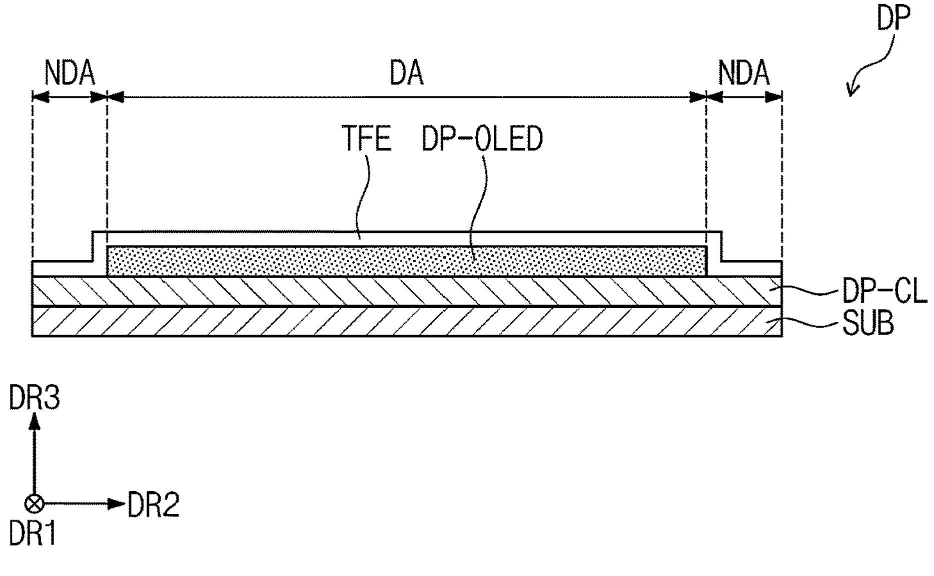
FIG. 3 is a view exemplarily illustrating a cross-section of a display panel illustrated in FIG. 2.

FIG. 3 is a view exemplarily illustrating a cross-section of a display panel illustrated in FIG. 2.

Illustratively, FIG. 3 illustrates a cross-section of the display panel DP viewed from the first direction DR1.

Referring to FIG. 3, the display panel DP includes a substrate SUB, a circuit element layer DP-CL disposed on the substrate SUB, a display element layer DP-OLED disposed on the circuit element layer DP-CL, and a thin-film encapsulation layer TFE on the display element layer DP-OLED.

The substrate SUB may include a display region DA and a non-display region NDA around the display region DA. The substrate SUB may include a flexible plastic material such as glass or polyimide ("PI"). The display element layer DP-OLED may be disposed on the display region DA.

A plurality of pixels may be disposed on the circuit element layer DP-CL and the display element layer DP-OLED. Each of the pixels may include a transistor disposed on the circuit element layer DP-CL and a light emitting element disposed in the display element layer DP-OLED and connected to the transistor.

The thin film encapsulation layer TFE may be disposed on the circuit element layer DP-CL to cover the display element layer DP-OLED. The thin film encapsulation layer TFE may protect the pixels from moisture, oxygen, and a foreign material.

Figure 4:
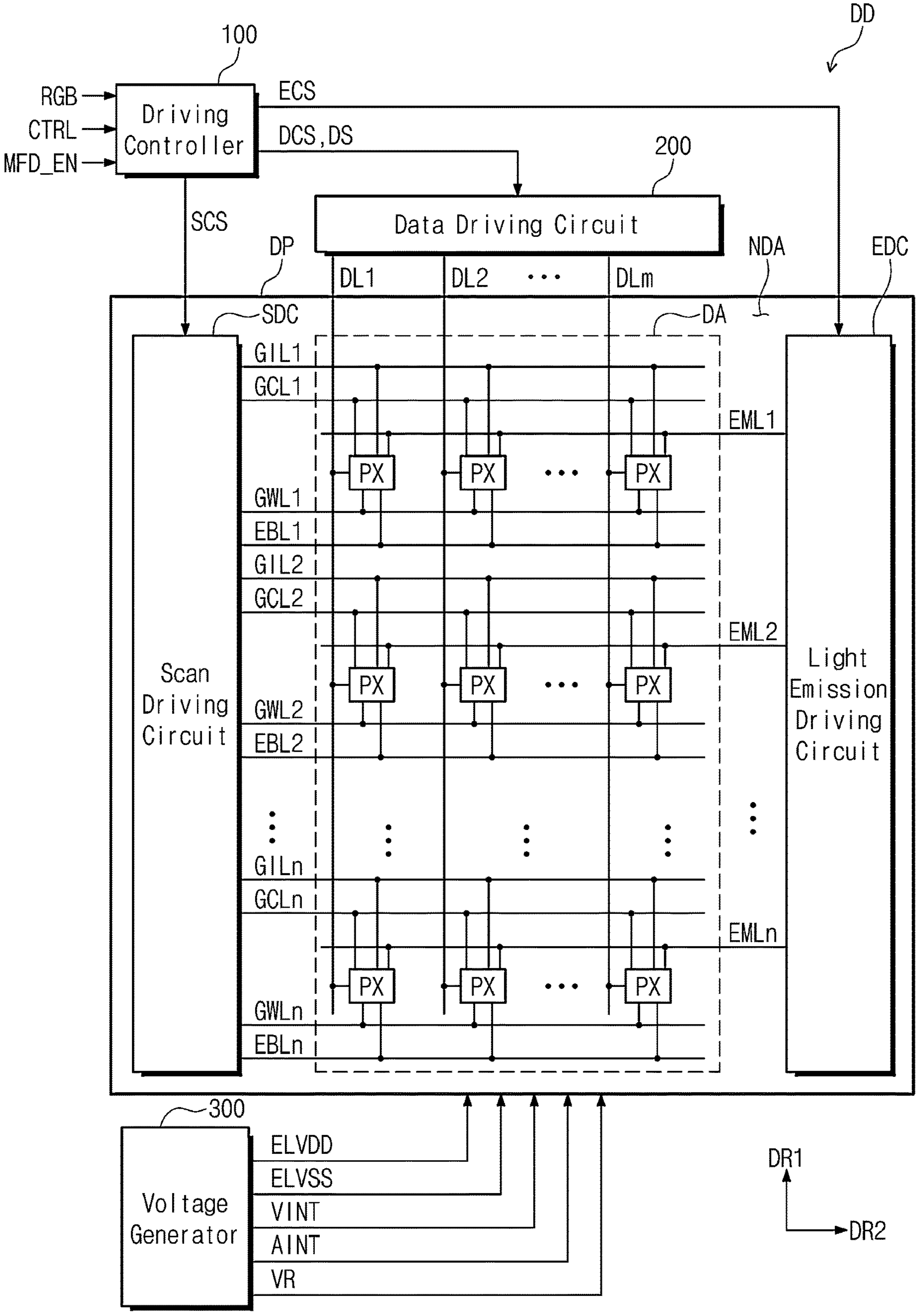
FIG. 4 is a block diagram of the display device illustrated in FIG. 1.

FIG. 4 is a block diagram of the display device illustrated in FIG. 1.

Referring to FIG. 4, the display device DD may include a display panel DP, a driving controller 100, a data driving circuit 200, a scan driving circuit SDC, a light emission driving circuit EDC, and a voltage generator 300. The driving controller 100 may be defined as a timing controller.

The display panel DP may include a plurality of scan lines GIL1 to GILn, GCL1 to GCLn, GWL1 to GWLn, and EBL1 to EBLn, a plurality of light emission lines EML1 to EMLn, a plurality of data lines DL1 to DLm, and a plurality of pixels PX. The n and the m may be natural numbers.

A planar region of the display panel DP may include the display region DA and the non-display region NDA surrounding the display region DA. The pixels PX may be disposed in the display region DA.

The pixels may each be electrically connected to the scan lines GIL1 to GILn, GCL1 to GCLn, GWL1 to GWLn, and EBL1 to EBLn, the light emission lines EML1 to EMLn, and the data lines DL1 to DLm. Each of the pixels PX may be electrically connected to four corresponding scan lines, one corresponding data line, and one corresponding light emission line.

The scan lines GIL1 to GILn, GCL1 to GCLn, GWL1 to GWLn, and EBL1 to EBLn may include a plurality of initialization scan lines GIL1 to GILn, a plurality of compensation scan lines GCL1 to GCLn, a plurality of write scan lines GWL1 to GWLn, and a plurality of bias scan lines EBL1 to EBLn.

Each of the pixels PX may be connected to a corresponding one among the initialization scan lines GIL1 to GILn, a corresponding one among the compensation scan lines GCL1 to GCLn, a corresponding one among the write scan lines GWL1 to GWLn, and a corresponding one among the bias scan lines EBL1 to EBLn.

The scan driving circuit SDC may be disposed on a first side of the display panel DP. The scan lines GIL1 to GILn, GCL1 to GCLn, GWL1 to GWLn, and EBL1 to EBLn may extend in the second direction DR2 from the scan driving circuit SDC.

The light emission driving circuit EDC may be disposed on a second side of the display panel DP opposite to the first side of the display panel DP. The light emission lines EML1 to EMLn may extend from the light emission driving circuit EDC in a direction opposite to the second direction DR2.

In an example illustrated in FIG. 4, the scan driving circuit SDC and the light emission driving circuit EDC are disposed facing each other with the pixels PX interposed therebetween, but the embodiment of the invention is not limited thereto. For example, the scan driving circuit SDC and the light emission driving circuit EDC may be disposed adjacent to either the first side or the second side of the display panel DP. In another embodiment, the scan driving circuit SDC and the light emission driving circuit EDC may be formed as one circuit.

The scan lines GIL1 to GILn, GCL1 to GCLn, GWL1 to GWLn, and EBL1 to EBLn and the light emission lines EML1 to EMLn may be arranged spaced apart from each other in the first direction DR1. The data lines DL1 to DLm may be extended from the data driving circuit 200 in a direction opposite to the first direction DR1, and arranged spaced apart from each other in the second direction DR2.

The driving controller 100 may receive an image signal RGB and a control signal CTRL. The driving controller 100 may generate an image data signal DS obtained by converting a data format of the image signal RGB to meet interface specifications with the data driving circuit 200. The driving controller 100 may output a scan control signal SCS, a data control signal DCS, and a light emission control signal ECS in response to the control signal CTRL.

The data driving circuit 200 may receive the data control signal DCS and the image data signal DS from the driving controller 100. The data driving circuit 200 may convert the image data signal DS into data signals and output the data signals. The data signals may be defined as analog voltages corresponding to a gray level of the image data signal DS. The data signals may be applied to the pixels PX through the data lines DL1 to DLm.

The voltage generator 300 may generate voltages for the operation of the display panel DP. The voltage generator 300 may generate a first driving voltage ELVDD, a second driving voltage ELVSS, a first initialization voltage VINT, a second initialization voltage INT, and a reference voltage VR. The first driving voltage ELVDD, the second driving voltage ELVSS, the first initialization voltage VINT, the second initialization voltage INT, and the reference voltage VR may be applied to the pixels PX.

In an embodiment of the invention, a level of the second initialization voltage AINT may vary depending on driving frequencies of the pixels PX. The above-described operation will be described in detail hereinafter. Although not illustrated, the level of the second initialization voltage AINT may varied by various control circuits. For example, depending on the control of a system board (e.g., a graphics processor or application processor) or the driving controller 100, the level of the second initialization voltage AINT may vary.

The scan driving circuit SDC may receive the scan control signal SCS from the driving controller 100. The scan driving circuit SDC may output scan signals to the scan lines GIL1 to GILn, GCL1 to GCLn, GWL1 to GWLn, and EBL1 to EBLn in response to the scan control signal SCS. The scan signals may be applied to the pixels PX through the scan lines GIL1 to GILn, GCL1 to GCLn, GWL1 to GWLn, and EBL1 to EBLn.

The light emission driving circuit EDC may receive the light emission control signal ECS from the driving controller 100. In response to the light emission control signal ECS, the light emission driving circuit EDC may output light emission signals to the light emission control lines EML1 to EMLn. The light emission signals may be applied to the pixels PX through the light emission lines EML1 to EMLn.

The pixels PX may be provided with data voltages in response to the scan signals. The pixels PX may display an image by emitting light of luminance corresponding to the data voltages in response to the light emission signals.

Figure 5:
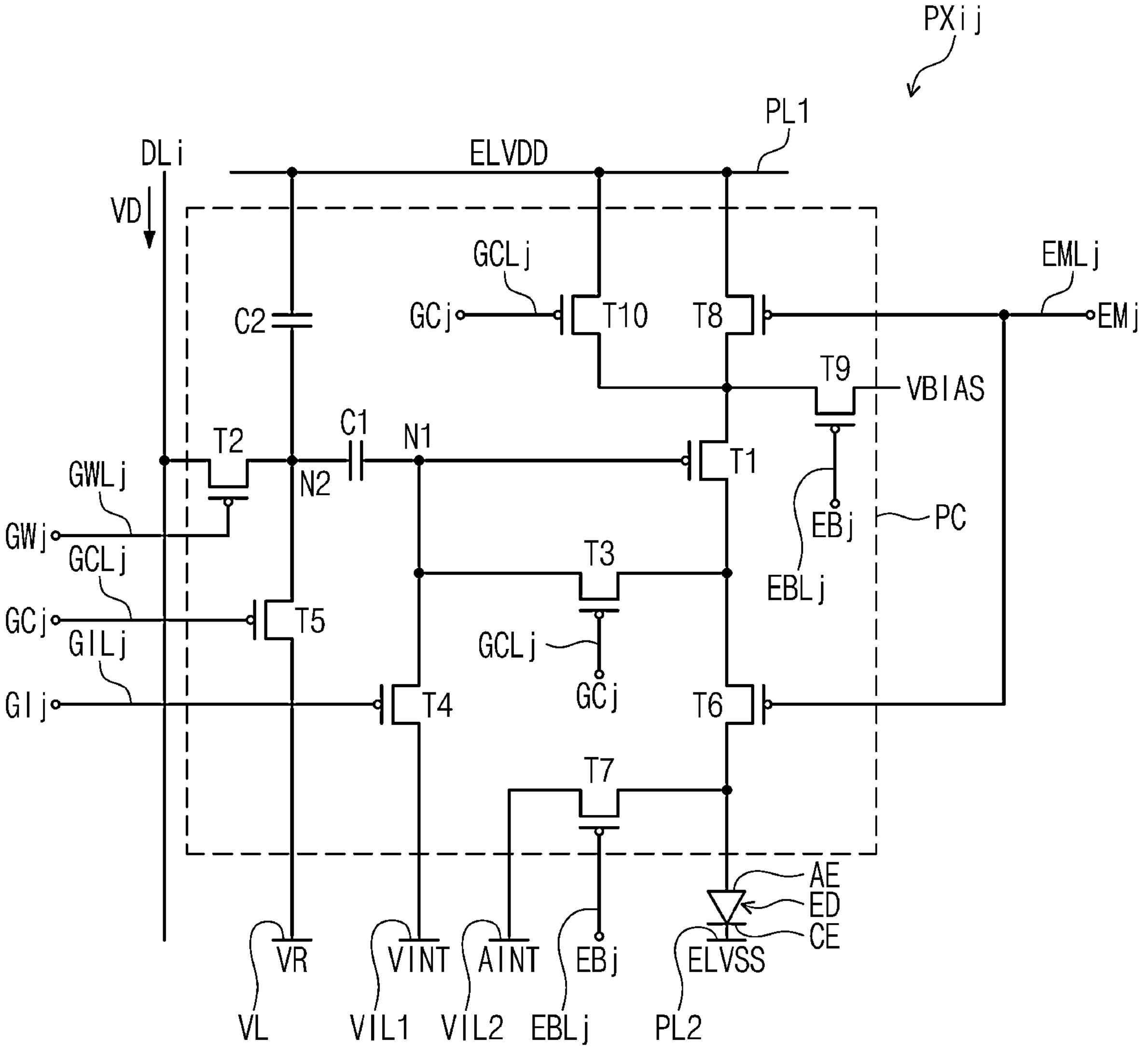
FIG. 5 is a view illustrating an equivalent circuit of one pixel illustrated in FIG. 4.
Figure 6:
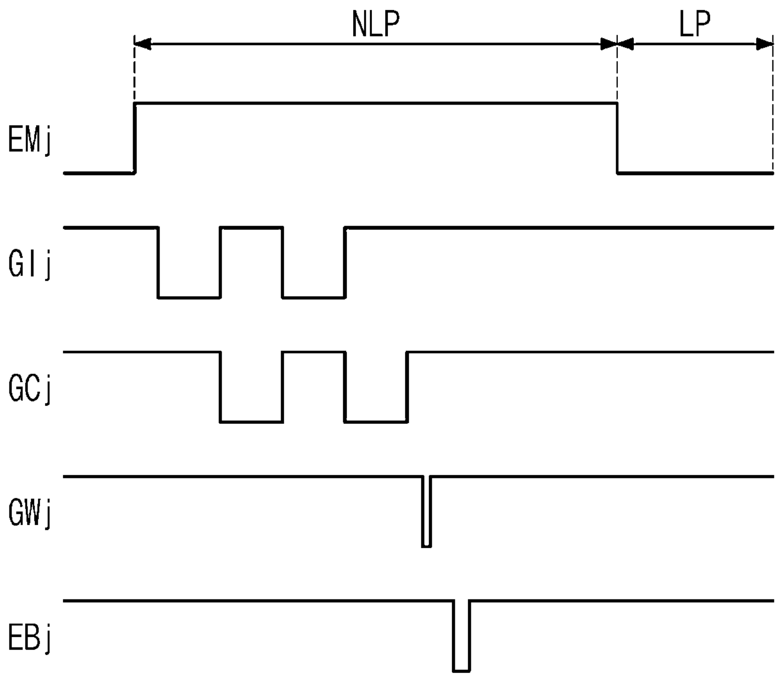
FIG. 6 is a timing diagram of signals for driving the pixel illustrated in FIG. 5.

FIG. 5 is a view illustrating an equivalent circuit of one pixel illustrated in FIG. 4. FIG. 6 is a timing diagram of signals for driving the pixel illustrated in FIG. 5.

Referring to FIG. 5, a pixel PXij may include a pixel circuit PC and a light emitting element ED connected to the pixel circuit PC. The i and the j are natural numbers. The pixel circuit PC may drive the light emitting element ED. The light emitting element ED may be defined as an organic light emitting element. The light emitting element ED may include an anode AE and a cathode CE.

The pixel circuit PC may include a plurality of transistors T1 to T10 and a plurality of capacitors C1 and C2. The transistors T1 to T10 and the capacitors C1 and C2 may control an amount of current flowing in the light emitting element ED. The light emitting element ED may generate light with a predetermined luminance according to the amount of current provided.

The pixel PXij may be connected to an i-th data line DLi, a j-th write scan line GWLj, a j-th compensation scan line GCLj, a j-th initialization scan line GILj, a j-th bias scan line EBLj, a j-th light emission line EMLj, a first initialization line VIL1, a second initialization line VIL2, a reference line VL, a bias line VBL, and first and second power lines PL1 and PL2.

The j-th write scan line GWLj may receive a j-th write scan signal GWj, and the j-th compensation scan line GCLj may receive a j-th compensation scan signal GCj. The j-th initialization scan line GILj may receive a j-th initialization scan signal GIj, and the j-th bias scan line EBLj may receive a j-th bias scan signal EBj. The j-th light emission line EMLj may receive a j-th light emission signal EMj.

The first initialization line VIL1 may receive the first initialization voltage VINT, and the second initialization line VIL2 may receive the second initialization voltage AINT. The bias line VBL may receive a bias voltage VBIAS, and the reference line VL may receive the reference voltage VR. The first power line PL1 may receive the first driving voltage ELVDD, and the second power line PL2 may receive the second driving voltage ELVSS.

The transistors T1 to T10 may each include a source electrode, a drain electrode, and a gate electrode. Hereinafter, in FIG. 5, any one of the source electrode or the drain electrode is defined as a first electrode, and the other one thereof is defined as a second electrode for convenience. In addition, the gate electrode is defined as a control electrode.

The transistors T1 to T10 may include first to tenth transistors T1 to T10. The first to tenth transistors T1 to T10 may be PMOS transistors, but are not limited thereto, and may be NMOS transistors. The capacitors C1 and C2 may include a first capacitor C1 and a second capacitor C2.

The first transistor T1 may be connected to the anode AE and the first power line PL1, and may be switchable by a voltage of a first node N1. In other words, the gate electrode of the first transistor T1 may receive voltage of a first node N1. The first transistor T1 may be connected to the anode AE through the sixth transistor T6, and may be connected to the first power line PL1 through the eighth transistor T8. The first transistor T1 may be disposed between the sixth transistor T6 and the eighth transistor T8, and may be connected to the sixth transistor T6 and the eighth transistor T8.

The first transistor T1 may include a first electrode connected to the eighth transistor T8, a second electrode connected to the sixth transistor T6, and a control electrode connected to the first node N1. The first transistor T1 may control an amount of current flowing in the light emitting element ED according to the voltage of the first node N1 applied to the control electrode of the first transistor T1. The first transistor T1 may be defined a driving transistor.

The second transistor T2 may be disposed between the i-th data line DLi and a second node N2, and may be connected to the i-th data line DLi and the second node N2. The second transistor T2 may be switchable by the j-th write scan signal GWj. The second transistor T2 may include a first electrode connected to the i-th data line DLi, a second electrode connected to the second node N2, and a control electrode connected to the j-th write scan line GWLj.

The first capacitor C1 may be connected to the first node N1 and the second node N2. The first capacitor C1 may be connected to the control electrode of the first transistor T1 through the first node N1, and may be connected to the second electrode of the second transistor T2 through the second node N2. The first capacitor C1 may include a first electrode connected to the first node N1 and a second electrode connected to the second node N2.

The second transistor T2 may be turned on by the j-th write scan signal GWj applied through the j-th write scan line GWLj. The turned-on second transistor T2 may receive a data voltage VD through the data line DLi. The data voltage VD may be provided to the first capacitor C1 through the turned-on second transistor T2. The second transistor T2 may be defined as a switching transistor.

The third transistor T3 may be connected to the second electrode of the first transistor T1 and to the first node N1. The third transistor T3 may include a first electrode connected to the second electrode of the first transistor T1, a second electrode connected to the first node N1, and a control electrode connected to the j-th compensation scan line GCLj.

The third transistor T3 may be turned on by the j-th compensation scan signal GCj applied through the j-th compensation scan line GCLj to electrically connect the second electrode of the first transistor T1 and the control electrode of the first transistor T1. When the third transistor T3 is turned on, the first transistor T1 and the third transistor T3 may be connected in a diode form. The third transistor T3 may be defined as a compensation transistor.

The fourth transistor T4 may be connected to the first node N1. The fourth transistor T4 may include a first electrode connected to the first node N1, a second electrode connected to the first initialization line VIL1, and a control electrode connected to the j-th initialization scan line GILj.

The fourth transistor T4 may be turned on by the j-th initialization scan signal GIj applied through the j-th initialization scan line GILj. The turned-on fourth transistor T4 may provide the first initialization voltage VINT applied through the first initialization line VIL1 to the first node N1. The fourth transistor T4 may be defined as a first initialization transistor.

The fifth transistor T5 may include a first electrode connected to the second node N2, a second electrode connected to the reference line VL, and a control electrode connected to the j-th compensation scan line GCLj. The fifth transistor T5 may be turned on by the j-th compensation scan signal GCj applied through the j-th compensation scan line GCj. The turned-on fifth transistor T5 may provide the reference voltage VR applied through the reference line VL to the second node N2.

The sixth transistor T6 may be connected to the first transistor T1 and the anode AE, and may be switchable by the light emission signal EMj. The sixth transistor T6 may include a first electrode connected to the second electrode of the first transistor T1, a second electrode connected to the anode AE, and a control electrode connected to the j-th light emission line EMLj. The sixth transistor T6 may be turned on by the j-th light emission signal EMj applied through the j-th light emission line EMLj. The sixth transistor T6 may be defined as a "first light emission control transistor".

The seventh transistor T7 may be connected to the anode AE and the second initialization line VIL2, and may be switchable by the j-th bias scan signal EBj. The seventh transistor T7 may include a first electrode connected to the anode AE, a second electrode connected to the second initialization line VIL2, and a control electrode connected to the j-bias scan line EBLj.

The seventh transistor T7 may be turned on by the j-th bias scan signal EBj applied through the j-th bias scan line EBLj. The turned-on seventh transistor T7 may provide the second initialization voltage AINT received through the second initialization line VIL2 to the anode AE of the light emitting element ED. The seventh transistor T7 may be defined as a "second initialization transistor".

The eighth transistor T8 may include a first electrode connected to the first power line PL1, a second electrode connected to the first electrode of the first transistor T1, and a control electrode connected to the j-th light emission line EMLj.

The eighth transistor T8 may be turned on by the j-th light emission signal EMj applied through the j-th light emission line EMLj. The eighth transistor T8 may be defined as a second light emission control transistor. When the sixth and eighth transistors T6 and T8 are turned on, the first driving voltage ELVDD may be provided to the light emitting element ED to allow a driving current to flow in the light emitting element ED. As a result, the light emitting element ED may emit light.

The ninth transistor T9 may include a first electrode connected to the bias line VBL, a second electrode connected to the first electrode of the first transistor T1, and a control electrode connected to the j-th bias scan line EBLj.

The ninth transistor T9 may be turned on by the j-th bias scan signal EBj applied through the j-th bias scan line EBLj. The turned-on ninth transistor T9 may provide the bias voltage VBIAS received through the bias line VBL to the first electrode of the first transistor T1.

The tenth transistor T10 may include a first electrode connected to the first power line PL1, a second electrode connected to the first electrode of the first transistor T1, and a control electrode connected to the j-th compensation scan line GCLj.

The tenth transistor T10 may be turned on by the j-th compensation scan signal GCj applied through the j-th compensation scan line GCj. The turned-on tenth transistor T10 may provide the first driving voltage ELVDD applied through the first power line PL1 to the first electrode of the first transistor T1.

The second capacitor C2 may include a first electrode connected to the second electrode of the second transistor T2 and a second electrode connected to the first power line PL1.

The anode AE may be connected to the first power line PL1 through the sixth, first, and eighth transistors T6, T1, and T8). The anode AE may receive the first driving voltage ELVDD through the sixth, first, and eighth transistors T6, T1, and T8.

The cathode CE may be connected to a second power line PL2. The cathode CE may receive the second driving voltage ELVSS having a lower level than the first driving voltage ELVDD through the second power line PL2.

FIG. 6 is a timing diagram of scan signals and light emission signals for describing an operation of the pixel illustrated in FIG. 5.

Hereinafter, an activation period of each signal indicates a low level in the timing diagram of FIG. 6, and a deactivation period of each signal indicates a high level in the timing diagram of FIG. 6.

Referring to FIG. 5 and FIG. 6, the j-th light emission signal EMj may include a non-light emission period NLP and a light emission period LP. The non-light emission period NLP may be defined as a deactivation period (e.g., a high-level period) of the j-th light emission signal EMj, and the light emission period LP may be defined as an activation period (e.g., a low-level period) of the j-th light emission signal EMj.

The j-th initialization scan signal GIj and the j-th compensation scan signal GCj may be repeatedly activated in a non-light emission period NLP. The j-th initialization scan signal GIj may be activated first, and the j-th compensation scan signal GCj may be activated next. An activation period of the j-th initialization scan signal GIj may not overlap an activation period of the j-th compensation scan signal GCj.

Illustratively, each of the j-th initialization scan signal GIj and the j-th compensation scan signal GCj may be activated twice in the non-light emission period NLP. In the light emission period LP, the j-th initialization scan signal GIj and the j-th compensation scan signal GCj may be deactivated.

In the non-light emission period NLP, after the j-th initialization scan signal GIj and the j-th compensation scan signal GCj are deactivated, the j-th write scan signal GWj may be activated, and then the j-th bias scan signal EBj may be activated. In the light emission period LP, the j-th write scan signal GWj and the j-th bias scan signal EBj may be deactivated.

In the non-light emission period NLP, the fourth transistor T4 may be turned on by the activated j-th initialization scan signal GIj. The first initialization voltage VINT may be provided to the first node N1 through the fourth transistor T4, and the first transistor T1 may be initialized. The above-described operation may be defined as an initialization operation.

Thereafter, in the non-light emission period NLP, the activated j-th compensation scan signal GCj may be applied to the third and tenth transistors T3 and T10 to turn on the third and tenth transistors T3 and T10.

The second electrode of the first transistor T1 and the control electrode of the first transistor T1 may be connected by the turned-on third transistor T3. As a result, the first transistor T1 and the third transistor T3 may be connected in a diode form. The first driving voltage ELVDD may be applied to the first electrode of the first transistor T1 through the turned-on tenth transistor T10.

In this case, a compensation voltage ELVDD-Vth reduced from the first voltage ELVDD by a threshold voltage Vth of the first transistor T1 may be applied to the control electrode of the first transistor T1. The above-described operation may be defined as a threshold voltage compensation operation.

In the non-light emission period NLP, the activated j-th compensation scan signal GCj may be applied to the fifth transistor T5 to turn on the fifth transistor T5. The reference voltage VR may be applied to the second node N2 by the turned-on fifth transistor T5.

As the j-th initialization scan signal GIj and the j-th compensation scan signal GCj are repeatedly activated, the above-described initialization and compensation operations may be repeatedly performed. As the initialization operation is repeatedly performed, data written in the first node N1 in the previous frame is completely removed, so that the first transistor T1 may be completely initialized.

A parasitic capacitor may be present in the third and fourth transistors T3 and T4. A gate-source voltage of the third and fourth transistors T3 and T4 may fluctuate due to the above-described parasitic capacitor. The second capacitor C2 may have a capacity greater than a capacity of the parasitic capacitor. The second capacitor C2 having a larger capacity may be connected to the third and fourth transistors T3 and T4 through the first node N1. The second capacitor C2 having a larger capacity may suppress fluctuations in the level of the gate-source voltage of the third and fourth transistors T3 and T4.

Thereafter, in the non-light emission period NLP, the activated j-th write scan signal GWj may be applied to the second transistor T2 to turn on the second transistor T2. The data voltage VD may be provided to the first capacitor C1 through the second transistor T2. In this case, the data voltage VD may be applied to the second node N2, and the voltage of the first node N1 may be ELVDD-Vth+VD-VR.

Thereafter, the seventh and ninth transistors T7 and T9 may be turned on by the activated j-th bias scan signal EBj. The second initialization voltage AINT may be provided to the anode AE through the turned-on seventh transistor T7 to initialize the anode AE to the second initialization voltage AINT. The bias voltage VBIAS may be applied to the first electrode of the first transistor T1 through the turned-on ninth transistor T9.

Thereafter, during the light emission period LP, a j-th light emission signal EMj may be applied to the sixth transistor T6 and the eighth transistor T8 to turn on the sixth transistor T6 and the eighth transistor T8. A driving current may be provided to the light emitting element ED through the sixth transistor T6 to allow the light emitting element ED to emit light.

A source-gate voltage Vsg of the first transistor T1 may be defined as a voltage difference between the first voltage ELVDD and the voltage ELVDD-Vth+VD-VR of the first node N1. When the source-gate voltage Vsg of the first transistor T1 is substituted into Equation 1 below, the threshold voltage Vth may be removed, and a driving current Id in Equation 1 may be proportional to $(VR-VD)^2$, which is a square value of a value obtained by subtracting the data voltage VD from the reference voltage VR. Therefore, the driving current Id may be determined regardless of the threshold voltage Vth of the first transistor T1.

$$Id = (1/2)\mu Cox(W/L)(Vsg-Vth)^2 \quad \text{[Equation 1]}$$

Equation 1 is a relation equation of the current and the voltage of a typical transistor.

The bias voltage VBIAS may be applied to the first electrode of the first transistor T1 through the ninth transistor T9 before the light emitting element ED emits light after the threshold voltage of the first transistor T1 is compensated. The shift of a hysteresis curve of the first transistor T1 may be suppressed by the bias voltage VBIAS. The above-described operation may be defined as a bias operation.

The pixel PXij may be driven at various frequencies. The timing of the scan signals GIj, GCj, GWj, and EBj and the light emission signal EMj according to the frequencies will be illustrated in FIGS. 7 to 10B.

FIGS. 7 through 10B are timing diagrams of scan signals and emission signals according to various frequencies.

Figure 7:
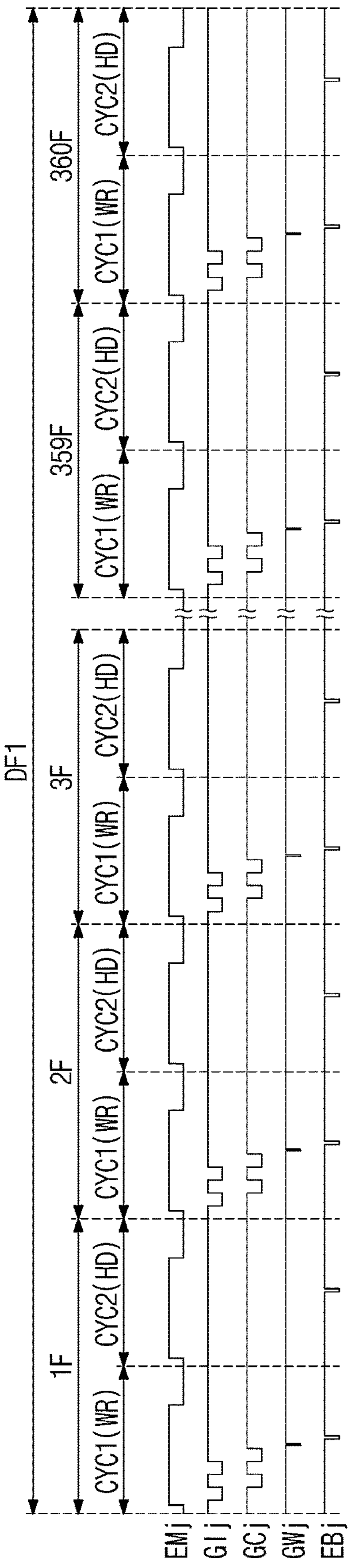
FIGS. 7 through 10B are timing diagrams of scan signals and emission signals according to various frequencies.

Referring to FIG. 6 and FIG. 7, a driving frequency DF1 of the pixel PXij may be approximately 360 Hz. Therefore, the driving frequency DF1 may include 360 frames 1F to 360F. The driving frequency DF1 may be defined as the highest driving frequency among the driving frequencies of the pixel PXij.

Each of the frames 1F to 360F may include a plurality of cycle periods CYC1 and CYC2. Each of the cycle periods CYC1 and CYC2 may be defined as one cycle of the light emission signal EMj having a deactivation period and an activation period.

Each of the cycle periods CYC1 and CYC2 of each of the frames 1F to 360F may include a first cycle period CYC1 and a second cycle period CYC2. The first cycle period CYC1 may be defined as a write cycle period WR, and the second cycle period CYC2 may be defined as a holding cycle period HD. There may be one write cycle period WR, one holding cycle HD, and a total of two cycle periods CYC1 and CYC2.

During the first cycle period CYC1, the j-th initialization scan signal GIj, the j-th compensation scan signal GCj, and the j-th write scan signal GWj may be activated and applied to the pixel PXij. In each of the first and second cycle periods CYC1 and CYC2, the j-th bias scan signal EBj may be activated and applied to the pixel PXij.

Figure 8A:
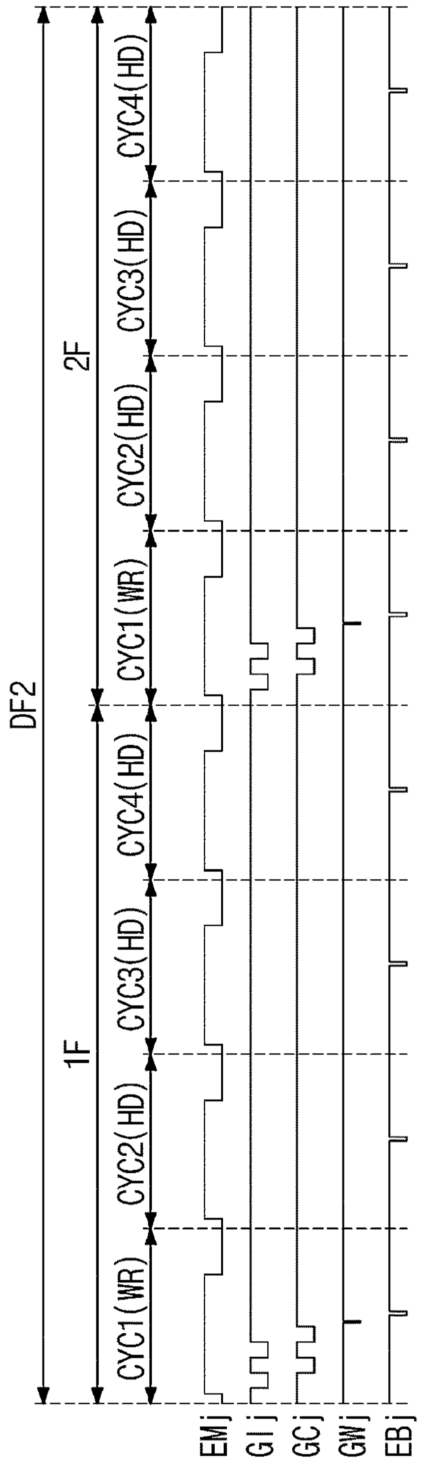
Figure 8B:
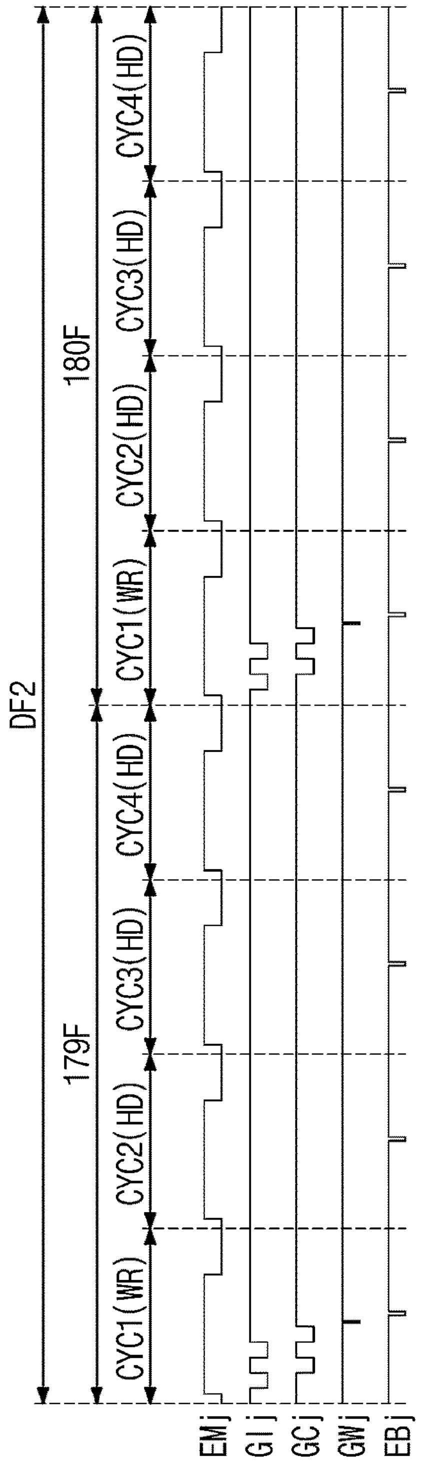

Referring to FIG. 8A and FIG. 8B, a driving frequency DF2 of the pixel PXij may be approximately 180 Hz. Therefore, the driving frequency DF2 may include 180 frames 1F to 180F. Illustratively, FIG. 8 illustrates first and second frames 1F and 2F, and FIG. 8B illustrates 179-th and 180-th frames 179F and 180F.

Each of the frames 1F to 180F may include a plurality of cycle periods CYC1, CYC2, CYC3, and CYC4. Each of the cycle periods CYC1, CYC2, CYC3, and CYC4 may be defined as a light emission signal EMj of one cycle.

The cycle periods CYC1, CYC2, CYC3, and CYC4 of each of the frames 1F to 180F may include a first cycle period CYC1 and a second cycle period CYC2, a third cycle period CYC3, and a fourth cycle period CYC4. The first cycle period CYC1 may be defined as a write cycle period WR, and the second, third, and fourth cycle periods CYC2, CYC3, and CYC4 may be defined as holding cycle periods HD. There may be one write cycle period WR, three holding cycles HD, and a total of four cycle periods CYC1, CYC2, CYC3, and CYC4.

During the first cycle period CYC1, the j-th initialization scan signal GIj, the j-th compensation scan signal GCj, and the j-th write scan signal GWj may be activated and applied to the pixel PXij. In each of the first, second, third, and fourth cycle periods CYC1, CYC2, CYC3, and CYC4, the j-th bias scan signal EBj may be activated and applied to the pixel PXij.

Figure 9A:
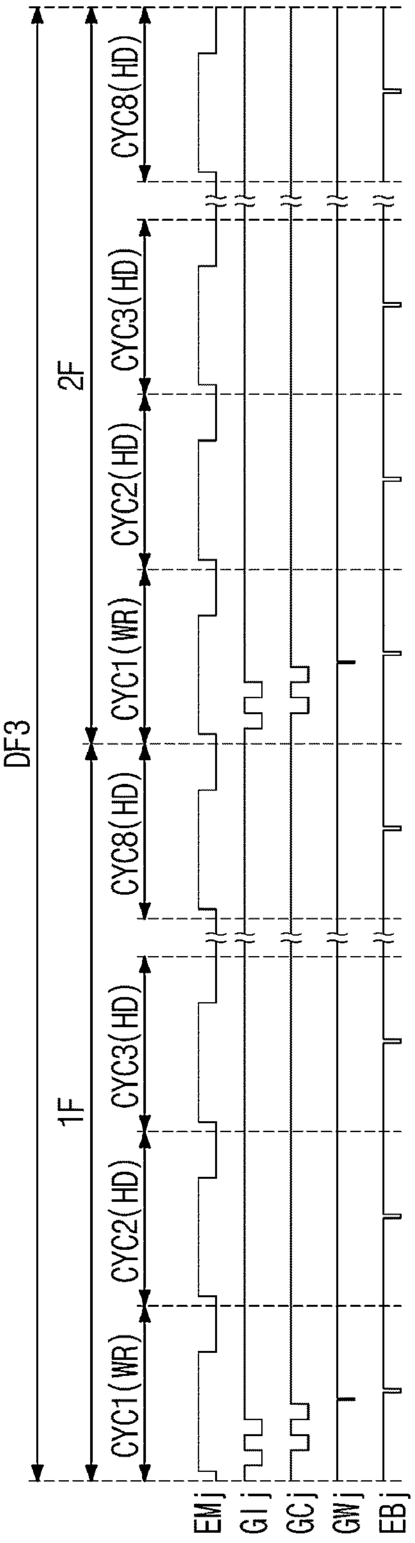
Figure 9B:
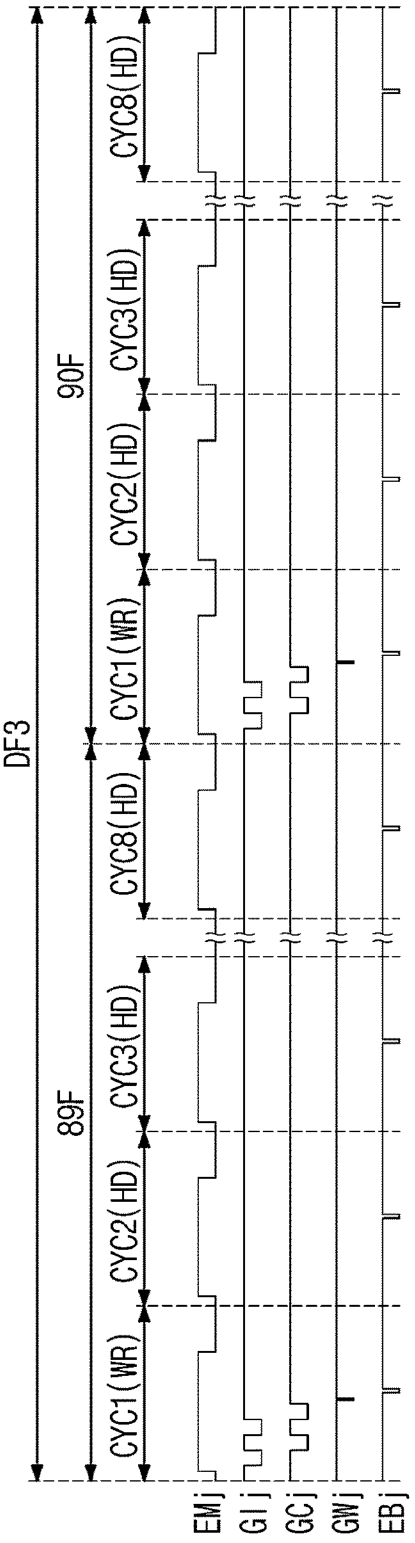

Referring to FIG. 9A and FIG. 9B, a driving frequency DF3 of the pixel PXij may be approximately 90 Hz. Therefore, the driving frequency DF3 may include 90 frames 1F to 90F. Illustratively, FIG. 9A illustrates first and second frames 1F and 2F, and FIG. 9B illustrates 89-th and 90-th frames 89F and 90F.

Each of the frames 1F to 90F may include a plurality of cycle periods CYC1, CYC2, CYC3, . . . , and CYC8. Each of the cycle periods CYC1, CYC2, CYC3, . . . , and CYC8 may be defined as a light emission signal EMj of one cycle.

The cycle periods CYC1, CYC2, CYC3, . . . , and CYC8 of each of the frames 1F to 90F may include first to eighth cycle periods CYC1 to CYC8. The first cycle period CYC1 may be defined as a write cycle period WR, and the second to eighth cycle periods CYC2 to CYC8 may be defined as holding cycle periods HD. There may be one write cycle period WR, seven holding cycles HD, and a total of eighth cycle periods CYC1 to CYC8.

During the first cycle period CYC1, the j-th initialization scan signal GIj, the j-th compensation scan signal GCj, and the j-th write scan signal GWj may be activated and applied to the pixel PXij. In each of the first to eighth cycle periods CYC1 to CYC8, the j-th bias scan signal EBj may be activated and applied to the pixel PXij.

Figure 10A:
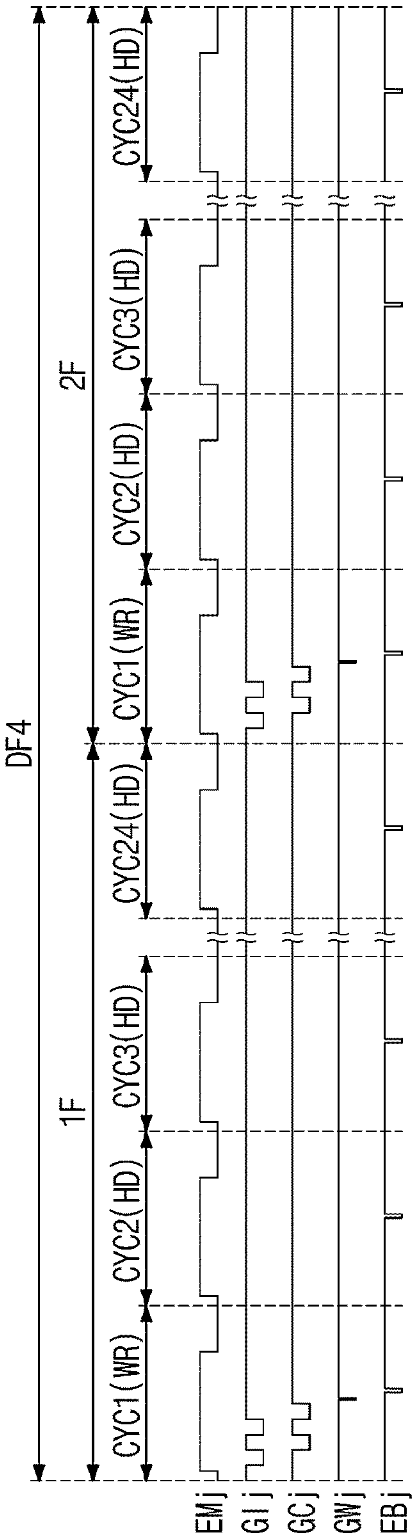
Figure 10B:
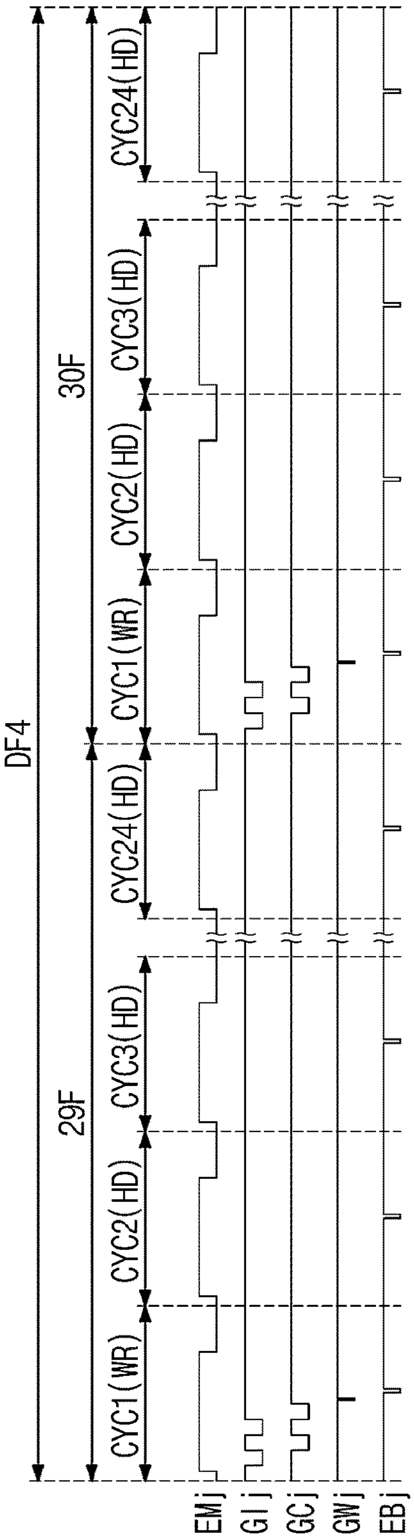

Referring to FIG. 10A and FIG. 10B, a driving frequency DF4 of the pixel PXij may be approximately 30 Hz. Therefore, the driving frequency DF4 may include 30 frames 1F to 30F. Illustratively, FIG. 10A illustrates first and second frames 1F and 2F, and FIG. 10B illustrates 29-th and 30-th frames 29F and 30F. The driving frequency DF4 may be defined as the lowest driving frequency among the driving frequencies of the pixel PXij.

Each of the frames 1F to 30F may include a plurality of cycle periods CYC1, CYC2, CYC3, . . . , and CYC24. Each of the cycle periods CYC1, CYC2, CYC3, . . . , and CYC24 may be defined as a light emission signal EMj of one cycle.

The cycle periods CYC1, CYC2, CYC3, . . . , and CYC24 of each of the frames 1F to 30F may include first to twenty fourth cycle periods CYC1 to CYC24. The first cycle period CYC1 may be defined as a write cycle period WR, and the second to twenty fourth cycle periods CYC2 to CYC24 may be defined as holding cycle periods HD. There may be one write cycle period WR, twenty three holding cycles HD, and a total of twenty four cycle periods CYC1 to CYC24.

During the first cycle period CYC1, the j-th initialization scan signal GIj, the j-th compensation scan signal GCj, and the j-th write scan signal GWj may be activated and applied to the pixel PXij. In each of the first to twenty fourth cycle periods CYC1 to CYC24, the j-th bias scan signal EBj may be activated and applied to the pixel PXij.

Hereinafter, a description in which a signal is applied to the pixel PXij may mean an operation in which an activated signal is applied to the pixel PXij. A description in which a signal is not applied to the pixel PXij may mean an operation in which a deactivated signal is applied to the pixel PXij.

Illustratively, the driving frequencies DF1, DF2, DF3, and DF4 of 360 Hz, 180 Hz, 90 Hz, and 30 Hz are described, but the embodiment of the invention is not limited thereto, and the pixel PXij may be driven at various driving frequencies in the range of approximately 360 Hz to approximately 30 Hz.

According to the aforementioned description, the j-th initialization scan signal GIj, the j-th compensation scan signal GCj, and the j-th write scan signal GWj may be applied to the pixel PXij according to the driving frequencies DF1, DF2, DF3, and DF4. That is, the number of times the j-th initialization scan signal GIj, the j-th compensation scan signal GCj, and the j-th write scan signal GWj are applied to the pixel PXij may be determined according to the driving frequencies DF1, DF2, DF3, and DF4.

The number of times the j-th initialization scan signal GIj, the j-th compensation scan signal GCj, and the j-th write scan signal GWj are applied to the pixel PXij may decrease as the driving frequencies DF1, DF2, DF3, and DF4 decrease.

The write cycle period WR may be defined as a period of time during which the j-th initialization scan signal GIj, the j-th compensation scan signal GCj, and the j-th write scan signal GWj are applied to the pixel PXij. Each of the holding cycle periods HD may be defined as a period of time during which the j-th initialization scan signal GIj, the j-th compensation scan signal GCj, and the j-th write scan signal GWj are not applied to the pixel PXij. In each of the write and holding cycle periods WR and HD, the j-th bias scan signal EBj may be applied to the pixel PXij.

Table 1 below shows the number of the write cycle period WR, the holding cycle period HD, and the total cycle period which constitute one frame according to various driving frequencies.

TABLE 1

| | Driving frequency (Hz) | | | | | | | | | |
|---|---|---|---|---|---|---|---|---|---|---|
| | 360 | 180 | 120 | 90 | 80 | 60 | 45 | 40 | 36 | 30 |
| WR | 1 | 1 | 1 | 1 | 1 | 1 | 1 | 1 | 1 | 1 |
| HD | 1 | 3 | 5 | 7 | 8 | 11 | 15 | 17 | 19 | 23 |
| TOTAL CYCLE | 2 | 4 | 6 | 8 | 9 | 12 | 16 | 18 | 20 | 24 |

As the driving frequency decreases, the number of the holding cycle periods HD and the total cycles in a frame may increase. A driving frequency of 360 Hz includes one holding cycle period HD, but driving frequencies of 180 Hz or below may include a plurality of holding cycle periods HD.

Figure 11:
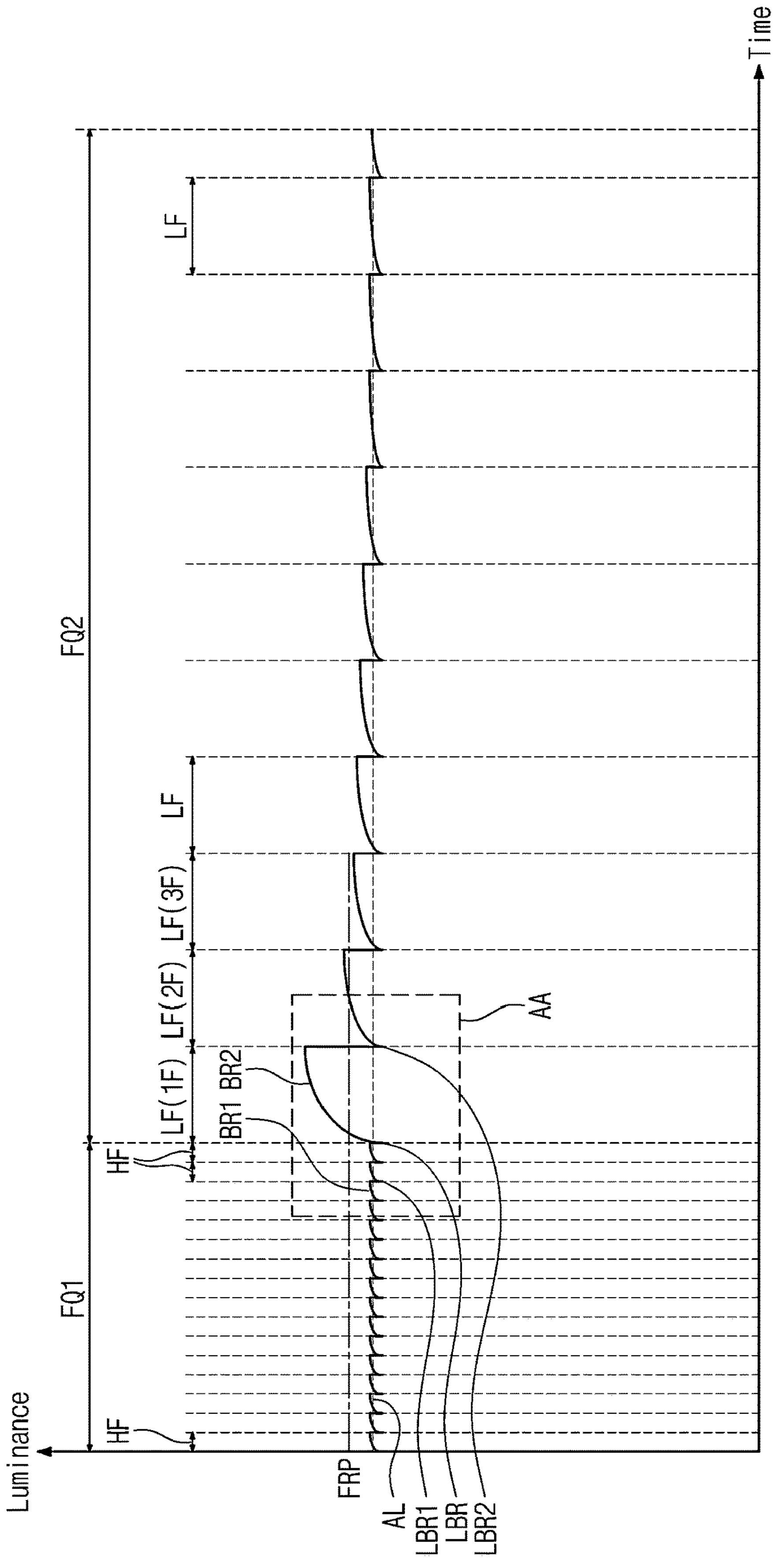
FIG. 11 is a view of a graph illustrating a luminance change of a pixel when a driving frequency of the pixel is converted from a first frequency to a second frequency.
Figure 12:
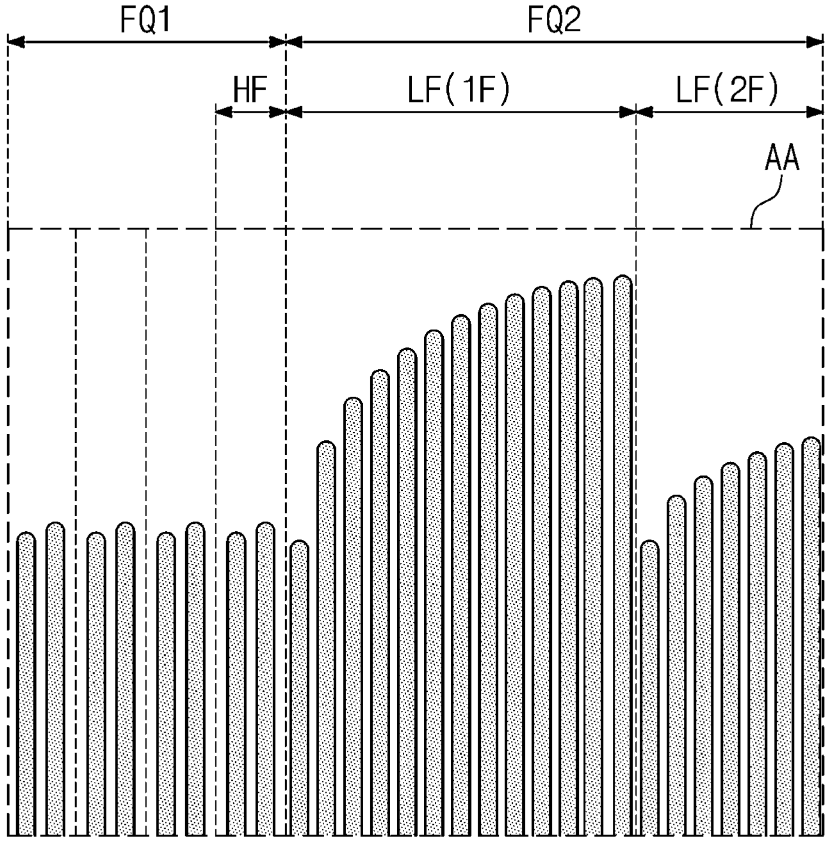
FIG. 12 is an enlarged view of region AA illustrated in FIG. 11.

FIG. 11 is a view of a graph illustrating a luminance change of a pixel when a driving frequency of the pixel is converted from a first frequency to a second frequency. FIG. 12 is an enlarged view of region AA illustrated in FIG. 11.

The graphs illustrated in FIG. 11 and FIG. 12 show substantially, a change in luminance of the pixel PXij when the aforementioned second initialization voltage AINT has a constant level. For convenience of description, FIG. 11 and FIG. 12 illustrate only some of the symbols of the frames HF and LF.

Referring to FIG. 11 and FIG. 12, the pixel PXij may be driven at a first frequency FQ1 and then may be driven at a second frequency FQ2. That is, a driving frequency of the pixel PXij may be converted from the first frequency FQ1 to the second frequency FQ2.

The first frequency FQ1 may be defined as a high frequency, and the second frequency FQ2 may be defined as a low frequency. Specifically, the first frequency FQ1 may be defined as a driving frequency having a higher frequency than the second frequency FQ2. The second frequency FQ2 may be defined as a driving frequency having a lower frequency than the first frequency FQ1.

Illustratively, the first frequency FQ1 may be a driving frequency DF1 of 360 Hz, and the second frequency FQ2 may be a driving frequency DF4 of 30 Hz, but under the condition that the first frequency FQ1 is higher than the second frequency FQ2, the value of the frequency is not limited thereto.

As described above, the j-th initialization scan signal GIj, the j-th compensation scan signal GCj, and the j-th write scan signal GWj may be applied to the pixel PXij at the first frequency FQ1 and the second frequency FQ2. According to the j-th initialization scan signal GIj, the j-th compensation scan signal GCj, and the j-th write scan signal GWj applied to the pixel PXij at the first frequency FQ1 and the second frequency FQ2, the transistors of the pixels PXij may be switched.

The first frequency FQ1 may include a plurality of frames HF, and the second frequency FQ2 may include a plurality of frames LF. Illustratively, any number of frames HF and any number of frames LF are illustrated in FIG. 11. A period of each of the frames HF of the first frequency FQ1, which is a high frequency, may be smaller than a period of each of the frames LF of the second frequency FQ2, which is a low frequency.

The luminance of the light emitting element ED of the pixel PXij may have a first luminance BR1 at the first frequency FQ1 and may have a second luminance BR2 at the second frequency FQ2. That is, the light emitting element ED may emit light so as to have the first luminance BR1 in the frames HF of the first frequency FQ1, and the light emitting element ED may emit light so as to have the second luminance BR2 in the frames LF of the second frequency FQ2.

The average luminance of light of the light emitting element ED generated at the first frequency FQ1 may be defined as an average level AL of the first luminance BR1. The average level AL of the first luminance BR1 is illustrated as a horizontal dotted line in FIG. 11. According to an initialization operation of the pixels PXij described above, at a boundary between the frames HF illustrated as a vertical dotted line, the first luminance BR1 may be temporarily lowered to a first low luminance level LBR1, which is lower than the average level AL, and then may gradually rise to a level higher than the average level AL.

According to the initialization operation of the pixels PXij, at a boundary between the frames LF illustrated as a vertical dotted line, the second luminance BR2 may be temporarily lowered to a second low luminance level LBR2, and then may gradually rise to a level higher than the average level AL. Even at a boundary between two frames HF and LF adjacent to each other, according to the initialization operation of the pixels PXij, the luminance of the light emitting element ED may be temporarily lowered to a lower luminance level LBR lower than the average level AL.

The bar graphs illustrated in FIG. 12 exemplarily show the number of times the light emitting element ED emits light in the frames HF and LF, and the number of times the light emitting element ED emits light should not be interpreted as the number of bar graphs illustrated in FIG. 12.

When the driving frequency of the pixel PXij is converted from the first frequency FQ1 to the second frequency FQ2, hysteresis properties of the first transistor T1 of the pixel PXij may be changed. A change in hysteresis properties is the largest in the first frame 1F, which is an initial frame among the frames LF of the second frequency FQ2, and then a change in hysteresis properties may gradually decrease in subsequent frames LF.

If an amount of change in the second luminance BR2 of light of the light emitting element ED generated at the second frequency FQ2 with respect to an average luminance (i.e., AL) of light of the light emitting element ED generated at the first frequency FQ1 is out of a predetermined range, a luminance change may be visually recognized.

For example, if the amount of change in the second luminance BR2 of the light of the light emitting element ED generated at the second frequency FQ2 with respect to the average level AL of the first luminance BR1 is greater than 4%, the luminance change may be visually recognized. If the amount of change in the second luminance BR2 with respect to the average level AL of the first luminance BR1 is 4% or less, the luminance change may not be visually recognized. A point at which the amount of change in the second luminance BR2 with respect to the average level AL of the first luminance BR1 is approximately 4% is illustrated as a dot dashed line in FIG. 11, and may be defined as a flicker reference point FRP.

Illustratively, in the first frame 1F and the second frame 2F among the frames LF, an amount of change in the second luminance BR2 with respect to the average level AL of the first luminance BR1 may deviate from 4%. As a result, the flicker phenomenon in which a luminance change is visually recognized may occur in the first frame 1F and the second frame 2F.

However, this is only illustratively described, and the amount of change in luminance may deviate from 4% not only in the second frame 2F, but also in a predetermined frame after the second frame 2F to allow the luminance change to be visually recognized. In addition, the amount of change in luminance may deviate from 4% only in the first frame 1F.

In addition, although the flicker reference point FRP for causing the flicker phenomenon to occur is set to 4%, this is only illustratively described, and the flicker reference point FRP may be set based on various criteria such as 3% or 5%.

Figure 13:
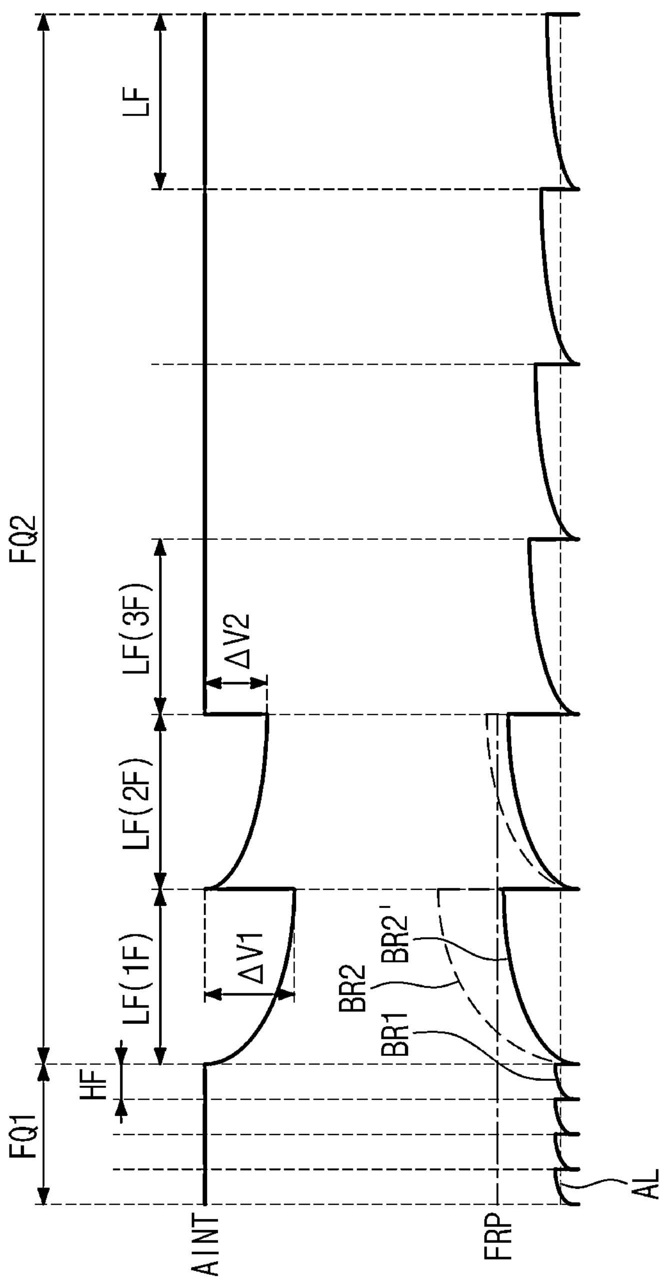
FIG. 13 is a view illustrating a level change of a second initialization voltage according to an embodiment of the invention.

FIG. 13 is a view illustrating a change in level of a second initialization voltage according to an embodiment of the invention.

FIG. 13 illustrates a luminance graph of some frames HF of the first frequency and some frames LF of the second frequency illustrated in FIG. 11 together with the second initialization voltage AINT. For convenience of description, the symbols of the frames HF and LF are illustrated only in some parts.

Referring to FIG. 5 and FIG. 13, the level of the second initialization voltage AINT may be variously adjusted in the frames LF of the second frequency FQ2. In a k-th frame and a k+1-th frame of the second frequency FQ2, the level of the second initialization voltage AINT may gradually change. For example, in each of the k-th frame and the k+1-th frame of the second frequency FQ2, the level of the second initialization voltage AINT may gradually decrease. The k is a natural number, and hereinafter, an embodiment of the invention will be described assuming that the k is 1.

The first frame 1F and the second frame 2F may be defined as frames adjacent to a point in time at which the first frequency FQ1 is converted to the second frequency FQ2. That is, the k-th frame and the k+1-th frame may be adjacent to the point in time at which the first frequency FQ1 is converted to the second frequency FQ2.

In each of the first frame 1F and the second frame 2F, the level of the second initialization voltage AINT may gradually change, and specifically, may be gradually lowered. An amount of change in the second initialization voltage AINT of the first frame 1F may be greater than an amount of change in the second initialization voltage AINT of the second frame 2F. Therefore, an amount of decrease in the second initialization voltage AINT of the first frame 1F may be greater than an amount of decrease in the second initialization voltage AINT of the second frame 2F.

That is, an amount of change in the second initialization voltage AINT of the k-th frame may be greater than an amount of change in the second initialization voltage AINT of the k+1-th frame, and specifically, an amount of total decrease in the second initialization voltage AINT during the k-th frame may be greater than an amount of total decrease in the second initialization voltage AINT during the k+1-th frame.

Since the amount of change in the second luminance BR2' is the largest in the first frame 1F, the amount of total decrease in the second initialization voltage AINT during the first frame 1F may be set to be the greatest. Since an amount of change in the second luminance BR2' of the second frame 2F is smaller than an amount of change in the second luminance BR2' of the first frame 1F, the amount of total decrease in the second initialization voltage AINT during the second frame 2F may be smaller than the amount of total decrease in the second initialization voltage AINT during the first frame 1F.

In an embodiment, a first voltage difference ΔV1 between the maximum value and the minimum value of the level of the second initialization voltage AINT of the first frame 1F may be greater than a second voltage difference ΔV2 between the maximum value and the minimum value of the level of the second initialization voltage AINT of the second frame 2F. That is, a first voltage difference ΔV1 between the maximum value and the minimum value of the level of the second initialization voltage AINT of the k-th frame may be greater than a second voltage difference ΔV2 between the maximum value and the minimum value of the level of the second initialization voltage AINT of the k+1-th frame.

When the level of the second initialization voltage AINT for initializing the anode AE is lowered, the luminance of the light emitting element ED may be lowered. Since the level of the second initialization voltage AINT of the first frame 1F gradually decreases during the first frame 1F, the second luminance BR2' in the first frame 1F may further decrease from the level of the second luminance BR2 illustrated in FIG. 11 (illustrated as a dotted line in FIG. 13).

Since the level of the second initialization voltage AINT of the second frame 2F gradually decreases, the second luminance BR2' in the second frame 2F may further decrease from the level of the second luminance BR2 illustrated in FIG. 11 (illustrated as a dotted line in FIG. 13).

As the amount of decrease in the second initialization voltage AINT increases, the second luminance BR2' may further decrease. Therefore, the second luminance BR2' may further decrease in the first frame 1F than in the second frame 2F. As a result, compared to the second luminance BR2 illustrated in FIG. 11, an amount of decrease in the second luminance BR2' of the first frame 1F may be greater than an amount of decrease in the second luminance BR2' of the second frame 2F.

The second luminance BR2' of each of the first frame 1F and the second frame 2F may be lowered than the flicker reference point FRP. As a result, the flicker phenomenon may not occur in the first frame 1F and the second frame 2F.

Illustratively, the level of the second initialization voltage AINT is adjusted to gradually decrease in each of the first and second frames 1F and 2F in FIG. 13, but the embodiment of the invention may not be limited thereto. Since the second luminance BR2 may be higher than the flicker reference point FRP in predetermined frames LF after the second frame 2F, the level of the second initialization voltage AINT may also be adjusted to gradually decrease in the predetermined frames LF after the second frame 2F in another embodiment.

Figure 14A:
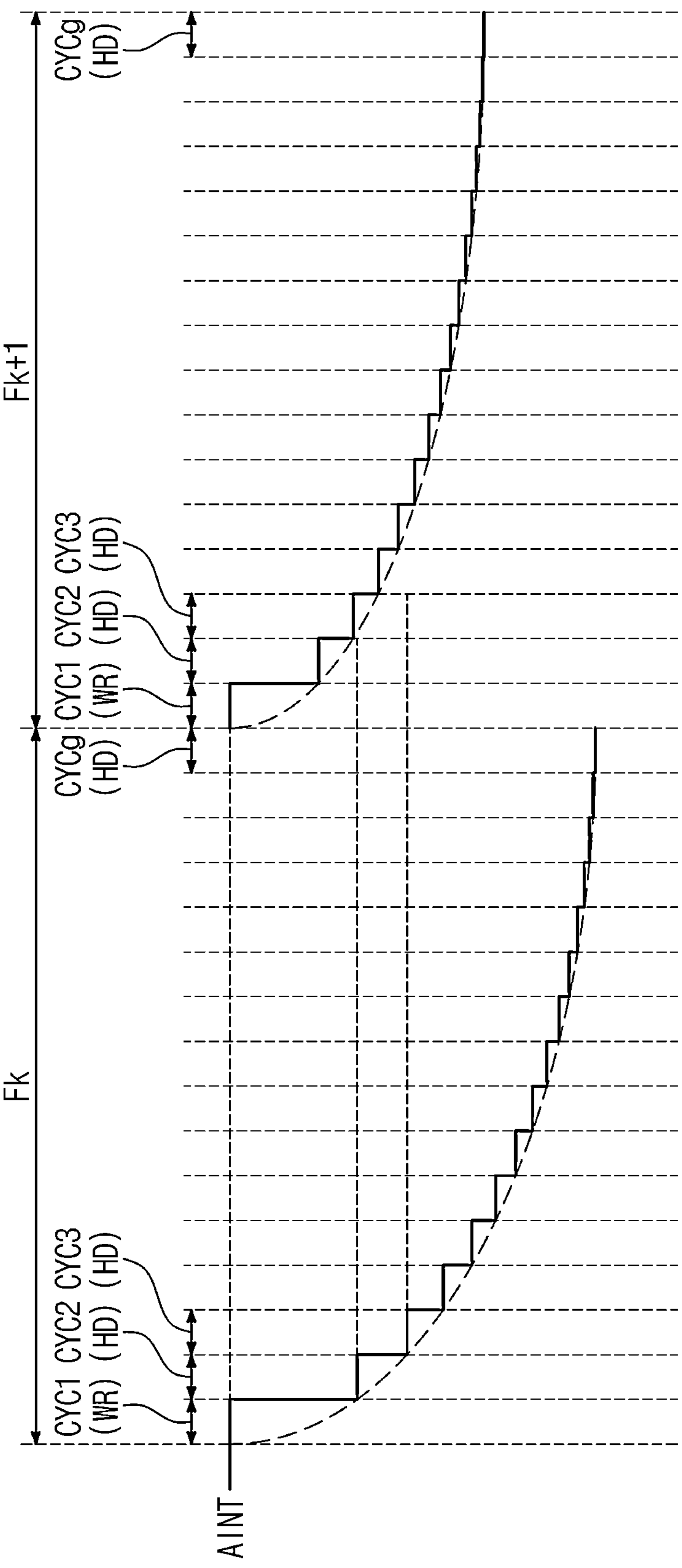
FIG. 14A to FIG. 14C are views illustrating various falling patterns of a second initialization voltage according to embodiments of the invention.
Figure 14B:
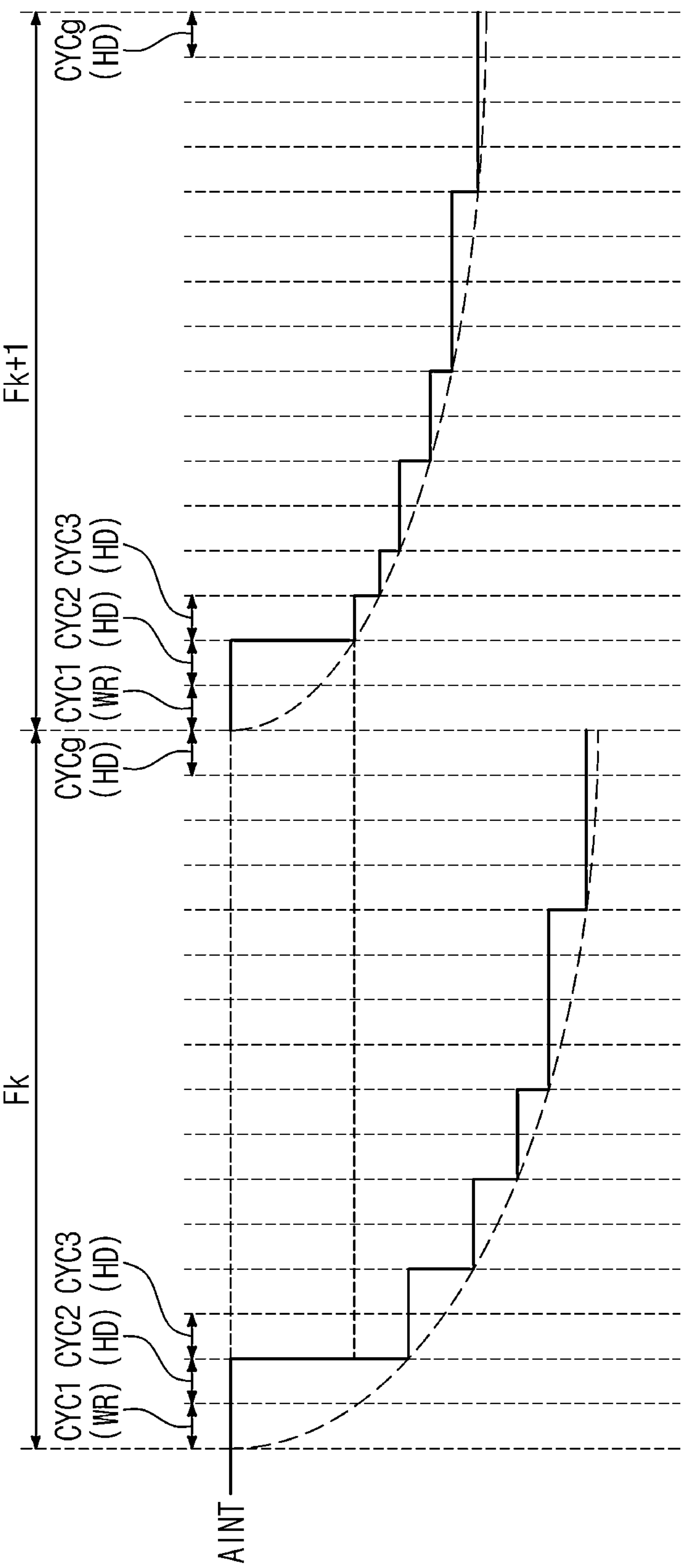
Figure 14C:
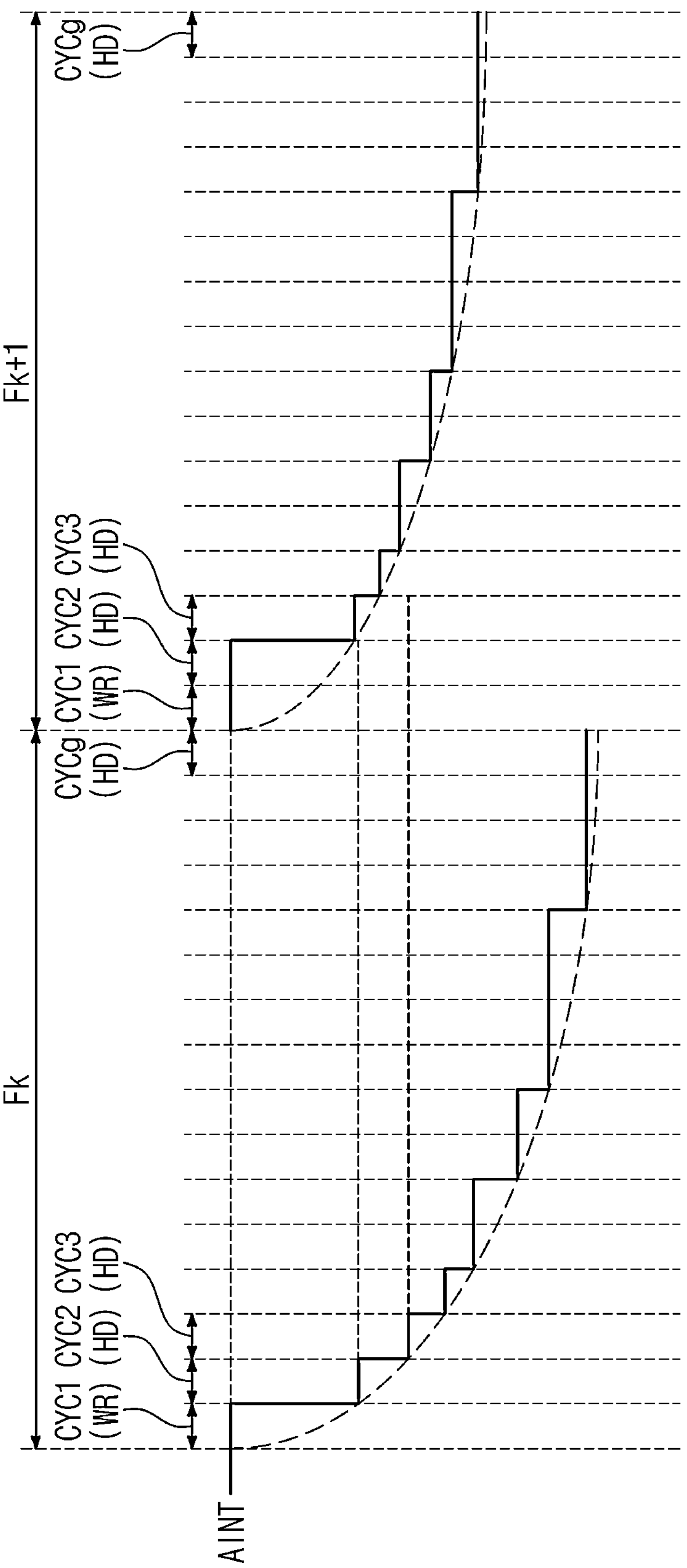

FIG. 14A to FIG. 14C are views illustrating various falling patterns of a second initialization voltage according to embodiments of the invention.

Illustratively, frames illustrated in FIG. 14A to FIG. 14C may be defined as a k-th frame Fk and a k+1-th frame Fk+1, and substantially, may correspond to the first frame 1F and the second frame 2F illustrated in FIG. 1, respectively 3.

Referring to FIG. 14A to FIG. 14C, each of the k-th frame Fk and the k+1-th frame Fk+1 may include a plurality of cycle periods CYC1 to CYCg. The g is a natural number of 3 or greater. The cycle periods CYC1 to CYCg may correspond to the cycle periods CYC1 to CYC24 described above with reference to FIG. 7 to FIG. 10B.

The cycle periods CYC1 to CYCg may include a write cycle period WR and a plurality of holding cycle periods HD. The first cycle period CYC1 may be defined as the write cycle period WR, and subsequent cycle periods CYC2 to CYCg may be defined as holding cycle periods HD.

A level of the second initialization voltage AINT of the write cycle period WR of the k+1-th frame Fk+1 may be the same as a level of the second initialization voltage AINT of the write cycle period WR of the k-th frame Fk. That is, a level of the second initialization voltage AINT of the first cycle period CYC1 of the k+1-th frame Fk+1 may be the same as a level of the second initialization voltage AINT of the first cycle period CYC1 of the k-th frame.

As illustrated in FIG. 14A to FIG. 14C, a falling pattern of the second initialization voltage AINT may be variously set.

Referring to FIG. 14A, in each of the k-th frame Fk and the k+1-th frame Fk+1, the level of the second initialization voltage AINT may gradually decrease as the cycle periods CYC1 to CYCg increase. For example, in each of the k-th frame Fk and the k+1-th frame Fk+1, the level of the second initialization voltage AINT of an h+1-th cycle period may be lower than the level of the second initialization voltage AINT of an h-th cycle period. The h is a natural number.

Specifically, in each of the k-th frame Fk and the k+1-th frame Fk+1, a level of the second initialization voltage AINT of the second cycle period CYC2 may be lower than the level of the second initialization voltage AINT of the first cycle period CYC1. In addition, a level of the second initialization voltage AINT of the third cycle period CYC3 may be lower than the level of the second initialization voltage AINT of the second cycle period CYC2. The above-described decrease pattern may be repeated, in each of the k-th frame Fk and the k+1-th frame Fk+1, until a g-th cycle period CYCg.

According to the above description, in the same frame, the level of the second initialization voltage AINT may gradually decrease as the cycle periods CYC1 to CYCg increase.

In the same holding cycle periods HD of the k and k+1-th frames Fk and Fk+1, a level of the second initialization voltage AINT of the holding cycle period HD of the k+1-th frame Fk+1 may be higher than a level of the second initialization voltage AINT of the holding cycle period HD of the k-th frame Fk. For example, a level of the second initialization voltage AINT of a p-th holding cycle of the k+1-th frame Fk+1 may be higher than of a level of the second initialization voltage AINT of a p-th holding cycle of the k-th frame Fk. The p is a natural number.

Specifically, a level of the second initialization voltage AINT of the first holding cycle period HD (e.g., the second cycle period CYC2) of the k+1-th frame Fk+1 may be higher than a level of the first initialization voltage AINT of the second holding cycle period HD (e.g., the second cycle period CYC2) of the k-th frame Fk.

In addition, a level of the second initialization voltage AINT of the second holding cycle period HD (e.g., the third cycle period CYC3) of the k+1-th frame Fk+1 may be higher than a level of the second initialization voltage AINT of the second holding cycle period HD (e.g., the third cycle period CYC3) of the k-th frame Fk. The above-described decrease pattern may be repeated until the g-th cycle period CYCg of the k and k+1-th frames Fk and Fk+1.

Referring to FIG. 14B and FIG. 14C, in each of the k-th frame Fk and the k+1-th frame Fk+1, a level of the second initialization voltage AINT of the h+1-th cycle period may be lower than or equal to a level of the second initialization voltage AINT of the h-th cycle period.

Referring to FIG. 14B, in the k-th frame Fk, the level of the second initialization voltage AINT of the second cycle period CYC2 may be the same as the level of the second initialization voltage AINT of the first cycle period CYC1. In the k-th frame Fk, the level of the second initialization voltage AINT of the third cycle period CYC3 may be lower than the level of the second initialization voltage AINT of the second cycle period CYC2.

In the k+1-th frame Fk+1, the level of the second initialization voltage AINT of the second cycle period CYC2 may be the same as the level of the second initialization voltage AINT of the first cycle period CYC1. In the k+1-th frame Fk+1, the level of the second initialization voltage AINT of the third cycle period CYC3 may be lower than of the second initialization voltage AINT of the second cycle period CYC2.

Referring to FIG. 14C, in the k-th frame Fk, the level of the second initialization voltage AINT of the second cycle period CYC2 may be lower than the second initialization voltage AINT of the first cycle period CYC1. In the k-th frame Fk, the level of the second initialization voltage AINT of the third cycle period CYC3 may be lower than the level of the second initialization voltage AINT of the second cycle period CYC2. In the k-th frame Fk, a level of the second initialization voltage AINT of some consecutive cycle periods of the subsequent cycle periods may be the same.

In the k+1-th frame Fk+1, the level of the second initialization voltage AINT of the second cycle period CYC2 may be the same as the level of the second initialization voltage AINT of the first cycle period CYC1. In the k+1-th frame Fk+1, the level of the second initialization voltage AINT of the third cycle period CYC3 may be lower than of the second initialization voltage AINT of the second cycle period CYC1. In the k+1-th frame Fk+1, a level of the second initialization voltage AINT of some consecutive cycle periods of the subsequent cycle periods may be the same.

The above-described decrease pattern may be repeated, in each of the k-th frame Fk and the k+1-th frame Fk+1, until a g-th cycle period CYCg.

According to the above description, cycles adjacent to each other in the same frame have the same level of the second initialization voltage AINT, or may have different levels of the second initialization voltage AINT, wherein the levels of the second initialization voltage AINT may gradually decrease.

Referring to FIG. 14B and FIG. 14C, a level of the second initialization voltage AINT of a p-th holding cycle period HD of the k+1-th frame may be higher than or equal to a level of the second initialization voltage AINT of a p-th holding cycle period HD of the k-th frame.

Referring to FIG. 14B, the level of the second initialization voltage AINT of the first holding cycle period HD (e.g., the second cycle period CYC2) of the k+1-th frame Fk+1 may be the same as a level of the second initialization voltage AINT of the first holding cycle period HD (e.g., the second cycle period CYC2) of the k-th frame Fk.

The level of the second initialization voltage AINT of the second holding cycle period HD (e.g., the third cycle period CYC3) of the k+1-th frame Fk+1 may be higher than the level of the second initialization voltage AINT of the second holding cycle period HD (e.g., the third cycle period CYC3) of the k-th frame Fk.

Referring to FIG. 14C, a level of the second initialization voltage AINT of the first holding cycle period HD (e.g., the second cycle period CYC3) of the k+1-th frame Fk+1 may be higher than a level of the second initialization voltage AINT of the first holding cycle period HD (e.g., the second cycle period CYC3) of the k-th frame Fk.

The level of the second initialization voltage AINT of the second holding cycle period HD (e.g., the third cycle period CYC3) of the k+1-th frame Fk+1 may be higher than the level of the second initialization voltage AINT of the second holding cycle period HD (e.g., the third cycle period CYC3) of the k-th frame Fk.

The above-described decrease pattern may be repeated until the g-th cycle period CYCg of the k and k+1-th frames Fk and Fk+1.

The decrease pattern of the second initialization voltage AINT in FIG. 14A, FIG. 14B, and FIG. 14C is exemplarily illustrated, and without being limited thereto, the decrease pattern of the second initialization voltage AINT may be variously set.

According to the above-described decrease pattern of the second initialization voltage AINT, luminance may decrease in initial frames of the second frequency FQ2. As a result, the flicker phenomenon may be reduced.

Table 2 below shows, illustratively, levels of the second initialization voltage AINT of the cycle periods CYC1 to CYC24 of each of the first, second, and third frames 1F, 2F, and 3F of 30 Hz.

TABLE 2

| 1F | | | | 2F | | | | 3F | | | |
|---|---|---|---|---|---|---|---|---|---|---|---|
| CYC | AINT (V) | CYC | AINT (V) | CYC | AINT (V) | CYC | AINT (V) | CYC | AINT (V) | CYC | AINT (V) |
| 1 | −2.4 | 13 | −2.47 | 1 | −2.4 | 13 | −2.42 | 1 | −2.4 | 13 | −2.4 |
| 2 | −2.4 | 14 | −2.47 | 2 | −2.4 | 14 | −2.42 | 2 | −2.4 | 14 | −2.4 |

TABLE 2-continued

| 1F | | | | 2F | | | | 3F | | | |
|---|---|---|---|---|---|---|---|---|---|---|---|
| CYC | AINT (V) | CYC | AINT (V) | CYC | AINT (V) | CYC | AINT (V) | CYC | AINT (V) | CYC | AINT (V) |
| 3 | −2.41 | 15 | −2.48 | 3 | −2.41 | 15 | −2.42 | 3 | −2.4 | 15 | −2.4 |
| 4 | −2.42 | 16 | −2.48 | 4 | −2.41 | 16 | −2.42 | 4 | −2.4 | 16 | −2.4 |
| 5 | −2.43 | 17 | −2.49 | 5 | −2.41 | 17 | −2.43 | 5 | −2.4 | 17 | −2.4 |
| 6 | −2.43 | 18 | −2.49 | 6 | −2.41 | 18 | −2.43 | 6 | −2.4 | 18 | −2.4 |
| 7 | −2.44 | 19 | −2.5 | 7 | −2.41 | 19 | −2.43 | 7 | −2.4 | 19 | −2.4 |
| 8 | −2.44 | 20 | −2.5 | 8 | −2.41 | 20 | −2.43 | 8 | −2.4 | 20 | −2.4 |
| 9 | −2.45 | 21 | −2.51 | 9 | −2.42 | 21 | −2.43 | 9 | −2.4 | 21 | −2.4 |
| 10 | −2.45 | 22 | −2.51 | 10 | −2.42 | 22 | −2.43 | 10 | −2.4 | 22 | −2.4 |
| 11 | −2.46 | 23 | −2.51 | 11 | −2.42 | 23 | −2.43 | 11 | −2.4 | 23 | −2.4 |
| 12 | −2.46 | 24 | −2.51 | 12 | −2.42 | 24 | −2.43 | 12 | −2.4 | 24 | −2.4 |

Referring to Table 2, levels of the second initialization voltage AINT of the first frame 1F and the second frame 2F may be changed, and levels of the second initialization voltage AINT of the third frame 3F may not be changed.

Similar to the above description, in each of the first frame 1F and the second frame 2F, the level of the second initialization voltage AINT of the h+1-th cycle period may be lower than or equal to the level of the second initialization voltage AINT of the h-th cycle period.

For example, a level of the second initialization voltage AINT of the second cycle period CYC2 of the first frame 1F may be the same as a level of the second initialization voltage AINT of the first cycle period CYC1 of the first frame 1F. A level of the second initialization voltage AINT of the third cycle period CYC3 of the first frame 1F may be lower than a level of an initialization voltage AINT of the second cycle period CYC2 of the first frame 1F.

Similar to the above description, a level of the second initialization voltage AINT of a p-th cycle period of the second frame 2F may be higher than or equal to a level of the second initialization voltage AINT of a p-th holding cycle of the first frame 1F. In Table 2, it may be a holding cycle starting from the second cycle CYC2.

For example, a level of the second initialization voltage AINT of the second cycle period CYC2 of the second frame 2F may be the same as a level of the second initialization voltage AINT of the second cycle period CYC2 of the first frame 1F. A level of the second initialization voltage AINT of the fourth cycle period CYC4 of the second frame 2F may be higher than a level of an initialization voltage AINT of the fourth cycle period CYC4 of the first frame 1F.

Table 3 below is a test result, which shows an amount of change in luminance of the first and second frames 1F and 2F according to a change in level of the second initialization voltage AINT. An amount of change in luminance of the third frame 3F is also described for reference.

Numerical values described in the items of the first, second, and third frames 1F, 2F, and 3F indicate an amount of change in luminance of a low frequency with respect to luminance of a high frequency, and the unit thereof is %. Before conversion indicates high frequencies and after conversion indicates low frequencies. The test was conducted with a low luminance of a 11 grayscale.

TABLE 3

| | Frequency | | AINT control | | |
|---|---|---|---|---|---|
| Gray | Before conversion | After conversion | 1F | 2F | 3F |
| 11 | 360 | 180 | 3.3 | 3.0 | 2.8 |
| | | 120 | 3.9 | 3.8 | 4.0 |
| | | 90 | 3.7 | 2.8 | 4.0 |

TABLE 3-continued

| | Frequency | | AINT control | | |
|---|---|---|---|---|---|
| Gray | Before conversion | After conversion | 1F | 2F | 3F |
| | | 60 | 2.5 | 2.2 | 3.8 |
| | | 45 | 1.7 | 1.3 | 2.5 |
| | | 30 | 0.4 | −0.1 | 0.6 |
| | 240 | 120 | 2.7 | 2.5 | 2.4 |
| | | 60 | 2.3 | 2.4 | 2.7 |
| | | 48 | 2.0 | 2.1 | 2.1 |
| | | 40 | 2.0 | 1.5 | 2.0 |
| | | 30 | 1.2 | 0.9 | 0.9 |
| | 120 | 60 | 1.4 | 1.3 | 1.2 |
| | | 40 | 1.2 | 1.2 | 1.2 |
| | | 30 | 0.9 | 1.0 | 0.7 |

Referring to Table 3, when the level of the second initialization voltage AINT is adjusted as shown in FIG. 13, an amount of change in the second luminance BR2 of a low frequency with respect to the first luminance BR1 of a high frequency may be 4% or less, as illustrated in Table 3.

Figure 15A:
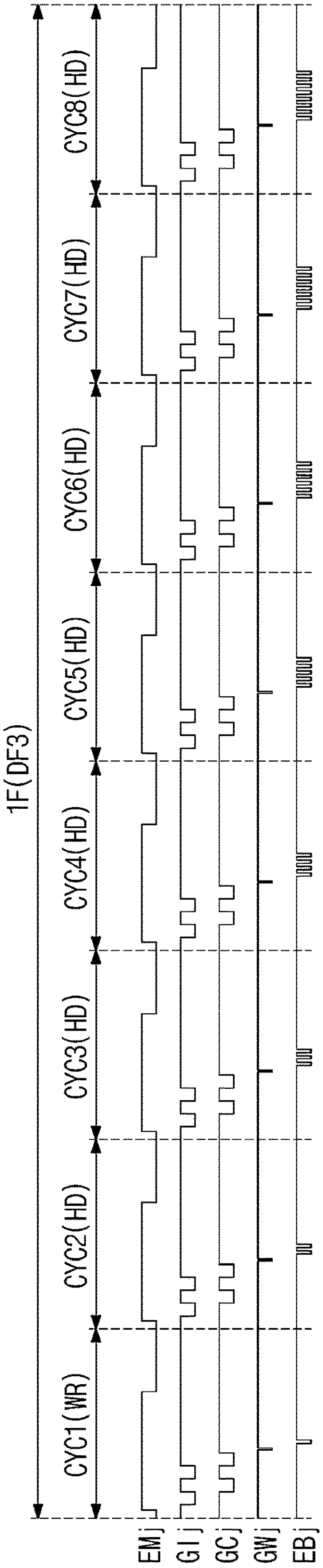
FIG. 15A and FIG. 15B are views illustrating timing of a bias scan signal according to another embodiment of the invention.
Figure 15B:
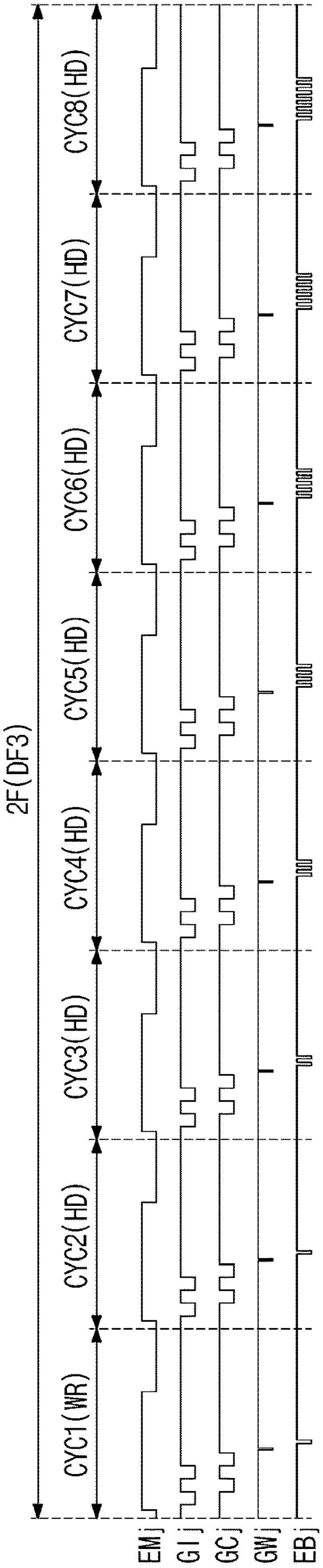

FIG. 15A and FIG. 15B are views illustrating timing of a bias scan signal according to another embodiment of the invention.

Illustratively, FIG. 15A and FIG. 15B illustrate a signal timing of a low frequency when conversion is performed from a high frequency to the low frequency, and in FIG. 15A and FIG. 15B, a driving frequency may be 90 Hz as shown in FIG. 9A and FIG. 9B.

In addition, similar to FIG. 13, as an operation to reduce the luminance of the first frame 1F and the second frame 2F, the scan signals GIj, GCj, GWj, and EBj of the first frame 1F and the second frame 2F, the light emission signal EMj, and a timing of the light emission signal EMj are illustrated.

Hereinafter, the timing of the signals illustrated in FIG. 15A and FIG. 15B will be explained focusing on a timing different from the timing illustrated in FIG. 9A and FIG. 9B.

Referring to FIG. 15A and FIG. 15B, the timing of the j-th initialization scan signal GIj, the j-th compensation scan signal GCj, the j-th write scan signal GWj, and the j-th light emission signal EMj may be substantially the same as the timing illustrated in FIG. 9A and FIG. 9B.

In the holding cycle periods HD of each of the k-th frame and the k+1-th frame, the number of times the bias scan signal EBj is applied per holding cycle period may vary. For example, in the first frame 1F, as the sequence of the cycle periods CYC1 to CYC8 increases (e.g., from the first cycle period CYC1 toward the eighth cycle period CYC8), the number of times the bias scan signal EBj is applied per cycle period may gradually increase. In addition, as an order a holding cycle period HD among of the holding cycle periods HD of each of the first frame 1F and the second frame 2F is later, the number of times the bias scan signal EBj is applied per holding cycle period may gradually increase.

When the seventh transistor T7 for initializing the anode AE is turned on more frequently, the second initialization voltage AINT may be provided more frequently to the anode AE. In this case, the anode AE may be further initialized to decrease the luminance of the light emitting element ED. Therefore, the luminance of the first frame 1F and the second frame 2F decreases to reduce the aforementioned flicker phenomenon.

An operation of varying the number of times the bias scan signal EBj is applied may be performed together with an operation of changing the level of the second initialization voltage AINT described above. However, the embodiment of the invention is not limited thereto, and in another embodiment, the operation of varying the number of times the bias scan signal EBj is applied may be performed, and the operation of changing the level of the second initialization voltage AINT may not be performed.

Figure 16A:
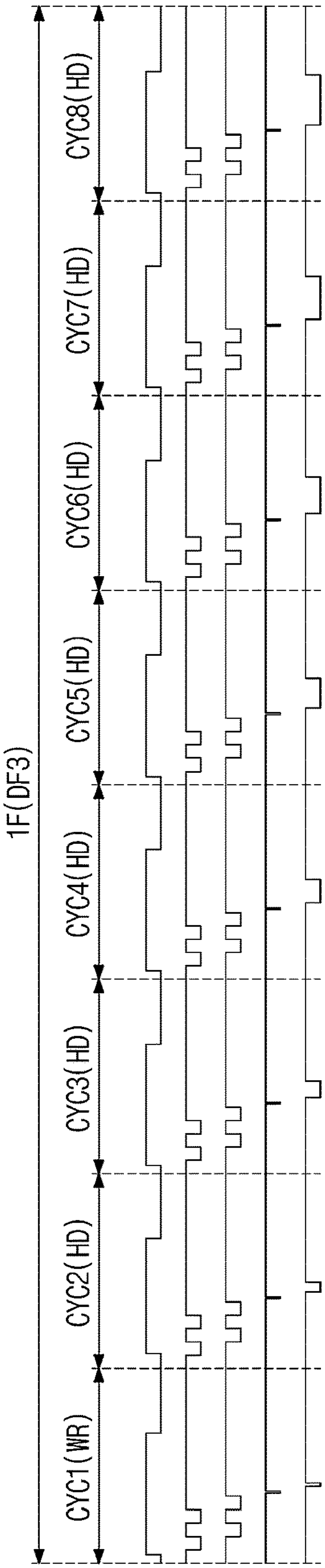
FIG. 16A and FIG. 16B are views illustrating timing of a bias scan signal according to still another embodiment of the invention.
Figure 16B:
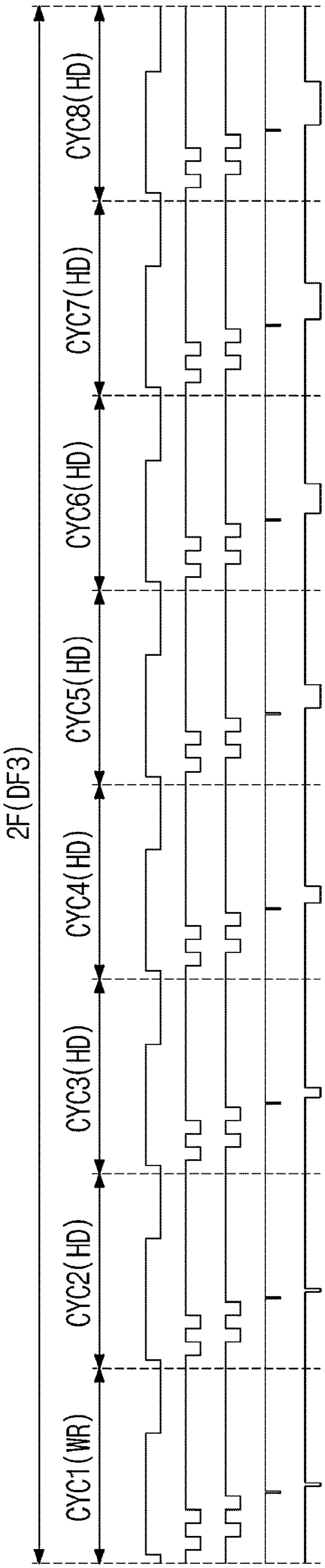

FIG. 16A and FIG. 16B are views illustrating timing of a bias scan signal according to still another embodiment of the invention.

Illustratively, like FIG. 15A and FIG. 15B, FIG. 16A and FIG. 16B illustrate a signal timing of the first and second frames 1F and 2F of a low frequency when conversion is performed from a high frequency to the low frequency, and a driving frequency may be 90 Hz. Therefore, FIG. 16A and FIG. 16B may correspond to the timing diagrams illustrated in FIG. 15A and FIG. 15B.

Hereinafter, the timing of the signals illustrated in FIG. 16A and FIG. 16B will be explained focusing on a timing different from the timing illustrated in FIG. 15A and FIG. 15B.

Referring to FIG. 16A and FIG. 16B, the timing of the j-th initialization scan signal GIj, the j-th compensation scan signal GCj, the j-th write scan signal GWj, and the j-th light emission signal EMj may be substantially the same as the timing illustrated in FIG. 15A and FIG. 15B.

In the holding cycle periods HD of each of the k-th frame and the k+1-th frame, a width (e.g., duration keeping an activation level) of the bias scan signal EBj may vary. For example, in the first frame 1F, as the sequence of the cycle periods CYC1 to CYC8 increases (e.g., from the first cycle period CYC1 toward the eighth cycle period CYC8), the width of the bias scan signal EBj may gradually increase. In addition, as the sequence of the holding cycle periods HD of each of the first frame 1F and the second frame 2F increases, the width of the bias scan signal EBj may gradually increase.

When the seventh transistor T7 for initializing the anode AE is turned on longer, the second initialization voltage AINT may be provided longer to the anode AE. In this case, the anode AE may be further initialized to decrease the luminance of the light emitting element ED. Therefore, the luminance of the first frame 1F and the second frame 2F decreases to reduce the aforementioned flicker phenomenon.

An operation of varying the width (e.g., duration keeping an activation level) of the bias scan signal EBj may be performed together with an operation of changing the level of the second initialization voltage AINT described above. However, the embodiment of the invention is not limited thereto, and the operation of varying the width of the bias scan signal EBj may be performed, and the operation of changing the level of the second initialization voltage AINT may not be performed.

According to an embodiment of the invention, when a driving frequency of pixels is converted from a high frequency to a low frequency, in initial frames of the low frequency, a second initialization voltage gradually decreases, so that an increase in luminance of the pixels may be suppressed. As a result, the difference in luminance of the pixels between the initial frames of the low frequency and the high frequency is reduced, which may reduce a flicker phenomenon.

Although the invention has been described with reference to embodiments the invention, it will be understood by those skilled in the art that various changes in form and details may be made therein without departing from the spirit and scope of the invention as set forth in the following claims. In addition, the embodiments disclosed in the invention are not intended to limit the technical spirit of the invention, and all technical concepts falling within the scope of the following claims and equivalents thereof are to be construed as being included in the scope of the invention.

What is claimed is:

1. A display device comprising:

a light emitting element including an anode and a cathode;

a first transistor connected to the anode and a power line, and switchable by a voltage of a first node;

a second transistor connected to a data line and a second node, and switchable by a write scan signal;

a capacitor connected to the first node and the second node; and an initialization transistor connected to the anode and an initialization line configured to receive an initialization voltage, and switchable by a bias scan signal, wherein the write scan signal is applied to the second transistor at a first frequency and a second frequency lower than the first frequency, wherein when converting from the first frequency to the second frequency, from a start point to an end point of a k-th frame of the second frequency, a level of the initialization voltage gradually decreases, wherein k is a natural number.

2. The display device of claim 1, wherein in a k+1-th frame of the second frequency, the level of the initialization voltage gradually decreases.

3. The display device of claim 2, wherein an amount of decrease in the initialization voltage of the k-th frame is greater than an amount of decrease in the initialization voltage of the k+1-th frame.

4. The display device of claim 3, wherein a first voltage difference between a maximum value and a minimum value of the level of the initialization voltage in the k-th frame is greater than a second voltage difference between a maximum value and a minimum value of the level of the initialization voltage in the k+1-th frame.

5. The display device of claim 3, wherein the k-th frame and the k+1-th frame are adjacent to a point in time at which the first frequency is converted to the second frequency.

6. The display device of claim 5, wherein k is 1.

7. The display device of claim 2, wherein each of the k-th frame and the k+1-th frame comprises a plurality of cycle periods, wherein the cycle periods comprise:

a write cycle period during which the write scan signal and the bias scan signal are applied; and a plurality of holding cycle periods during which the write scan signal is not applied, and the bias scan signal is applied.

8. The display device of claim 7, wherein a level of the initialization voltage during the write cycle period of the k+1-th frame is the same as a level of the initialization voltage during the write cycle period of the k-th frame.

9. The display device of claim 7, wherein in each of the k-th frame and the k+1-th frame, a level of the initialization voltage during an h+1-th cycle period is lower than a level of the initialization voltage during an h-th cycle period, wherein h is a natural number.

10. The display device of claim 7, wherein a level of the initialization voltage during a p-th holding cycle period of the k+1-th frame is higher than a level of the initialization voltage during a p-th holding cycle period of the k-th frame, wherein p is a natural number.

11. The display device of claim 7, wherein in each of the k-th frame and the k+1-th frame, a level of the initialization voltage during an h+1-th cycle period is lower than or equal to a level of the initialization voltage during an h-th cycle period, wherein h is a natural number.

12. The display device of claim 7, wherein a level of the initialization voltage during a p-th holding cycle period of the k+1-th frame is higher than or equal to a level of the initialization voltage during a p-th holding cycle period of the k-th frame, wherein p is a natural number.

13. The display device of claim 7, further comprising a light emission control transistor connected to the first transistor and the anode, and switchable by a light emission signal, wherein each of the cycle periods is defined as one cycle of the light emission signal.

14. The display device of claim 7, wherein in the holding cycle periods of each of the k-th frame and the k+1-th frame, number of times the bias scan signal is applied per holding cycle period varies.

15. The display device of claim 14, wherein as an order of a holding cycle period among the holding cycle periods of each of the k-th frame and the k+1-th frame is later, the number of times the bias scan signal is applied per holding cycle period gradually increases.

16. The display device of claim 7, wherein in the holding cycle periods of each of the k-th frame and the k+1-th frame, a duration of an activation level of the bias scan signal varies.

17. The display device of claim 16, wherein as an order of a holding cycle period among the holding cycle periods of each of the k-th frame and the k+1-th frame is later, the duration of the activation level of the bias scan signal in the holding cycle period gradually increases.

18. A display device comprising:

a light emitting element including an anode and a cathode;

a first transistor connected to the anode and a power line, and switchable by a voltage of a first node;

a second transistor connected to a data line and a second node, and switchable by a write scan signal;

a capacitor connected to the first node and the second node; and an initialization transistor connected to the anode and an initialization line configured to receive an initialization voltage, and switchable by a bias scan signal, wherein the write scan signal is applied to the second transistor at a first frequency and a second frequency lower than the first frequency, wherein when converting from the first frequency to the second frequency, in each of a k-th frame of the second frequency and a k+1-th frame of the second frequency, a level of the initialization voltage gradually changes, and an amount of change in the initialization voltage of the k-th frame is greater than an amount of change in the initialization voltage of the k+1-th frame, wherein k is a natural number, wherein from a start point to an end point of the k-th frame of the second frequency, a level of the initialization voltage gradually decreases.

19. The display device of claim 18, wherein in the k+1-th frame, the level of the initialization voltage gradually decreases.

20. The display device of claim 19, wherein an amount of total decrease in the initialization voltage during the k-th frame is greater than an amount of total decrease in the initialization voltage during the k+1-th frame.

21. An electronic device comprising a display device for providing images, wherein the display device comprises:

a light emitting element including an anode and a cathode;

a first transistor connected to the anode and a power line, and switchable by a voltage of a first node;

a second transistor connected to a data line and a second node, and switchable by a write scan signal;

a capacitor connected to the first node and the second node; and an initialization transistor connected to the anode and an initialization line configured to receive an initialization voltage, and switchable by a bias scan signal, wherein the write scan signal is applied to the second transistor at a first frequency and a second frequency lower than the first frequency, wherein when converting from the first frequency to the second frequency, from a start point to an end point of a k-th frame of the second frequency, a level of the initialization voltage gradually decreases, wherein k is a natural number.

* * * * *